MAGNETIC DRUM COMPUTER

Filed Sept. 18, 1952 10 Sheets-Sheet 1

INVENTORS H. A. HENNING
O. J. MURPHY
H. M. TEAGER
BY R.O. Covell
ATTORNEY

Oct. 7, 1958 H. A. HENNING ET AL 2,855,146

MAGNETIC DRUM COMPUTER

Filed Sept. 18, 1952 10 Sheets-Sheet 2

INVENTORS H. A. HENNING
O. J. MURPHY
H. M. TEAGER
BY R. O. Covell
ATTORNEY

Oct. 7, 1958 H. A. HENNING ET AL 2,855,146

MAGNETIC DRUM COMPUTER

Filed Sept. 18, 1952 10 Sheets-Sheet 3

INVENTORS H. A. HENNING
O. J. MURPHY
H. M. TEAGER

BY R. O. Covell
ATTORNEY

MAGNETIC DRUM COMPUTER

Filed Sept. 18, 1952 10 Sheets-Sheet 4

INVENTORS H. A. HENNING
O. J. MURPHY
H. M. TEAGER
BY
R. O. Covell
ATTORNEY

INVENTORS H. A. HENNING
O. J. MURPHY
H. M. TEAGER
BY R. O. Covell
ATTORNEY

INVENTORS H. A. HENNING
O. J. MURPHY
H. M. TEAGER
BY R. O. Covell
ATTORNEY

MAGNETIC DRUM COMPUTER

Filed Sept. 18, 1952

INVENTORS H. A. HENNING
O. J. MURPHY
H. M. TEAGER
BY
R. O. Covell
ATTORNEY

INVENTORS H. A. HENNING
O. J. MURPHY
H. M. TEAGER
BY
R.O. Covell
ATTORNEY

INVENTORS H. A. HENNING
O. J. MURPHY
H. M. TEAGER
BY R. O. Covell
ATTORNEY

Oct. 7, 1958 H. A. HENNING ET AL 2,855,146

MAGNETIC DRUM COMPUTER

Filed Sept. 18, 1952 10 Sheets-Sheet 10

INVENTORS H. A. HENNING
O. J. MURPHY
H. M. TEAGER

BY R. O. Covell
ATTORNEY

United States Patent Office 2,855,146

Patented Oct. 7, 1958

2,855,146

MAGNETIC DRUM COMPUTER

Harley A. Henning, Millington, N. J., and Orlando J. Murphy, New York, and Herbert M. Teager, Brooklyn, N. Y., assignors to Bell Telephone Laboratories, Incorporated, New York, N. Y., a corporation of New York Application September 18, 1952, Serial No. 310,264

32 Claims. (Cl. 235—61)

This invention relates to computers, and more particularly to computers embodying a moving magnetizable medium as an element thereof.

The object of this invention is to increase the facility, the rapidity and the accuracy with which certain mathematical operations may be performed.

A feature of this invention is a computer comprising, as an integral operational part of the computing mechanism, a moving magnetizable medium and a magnetic head.

Another feature of this invention is a computer mechanism in which data recorded in elemental form on a magnetizable medium control the elemental operations of the computer.

Another feature of this invention is a computer mechanism in which a magnetic head is capable of both reading an informational unit from and writing an informational unit on an elemental area of a moving magnetizable medium at each movement of the medium past the magnetic head.

Another feature of this invention is a computer mechanism in which a magnetic head is operative, under a plurality of controls, to read the contents of an elemental area on a magnetizable surface and of writing the complement of that which was read in the same elemental area at the same pass of the magnetizable medium past the magnetic head.

Another feature of this invention is a computing mechanism in which the plural digits of a number are recorded on a magnetizable medium in coded form and in which the digits are selectively modified in accordance with the results of a mathematical operation performed on those digits.

Another feature of this invention is a computing mechanism in which the plural digits of a number are recorded on a magnetizable medium in coded form and in which each of the digits is selectively modified in accordance with the results both of a mathematical operation performed on that digit and of a mathematical operation performed on a preceding digit.

The manner in which the foregoing object is accomplished and the exact nature of the listed and other features of the invention are set forth in the following detailed description of preferred embodiments of the invention, when read with reference to the accompanying drawings in which.

Throughout this specification certain of the elements of the apparatus will be designated by a three-digit number, the hundreds digit of which is the same as the number of the figure upon which the element appears; others of the elements will be designated functionally, i. e., by a group of letters suggesting the function performed by the apparatus, and such designation will normally be followed by a number in parentheses denoting the figure upon which the element appears.

Figures 1, 2:
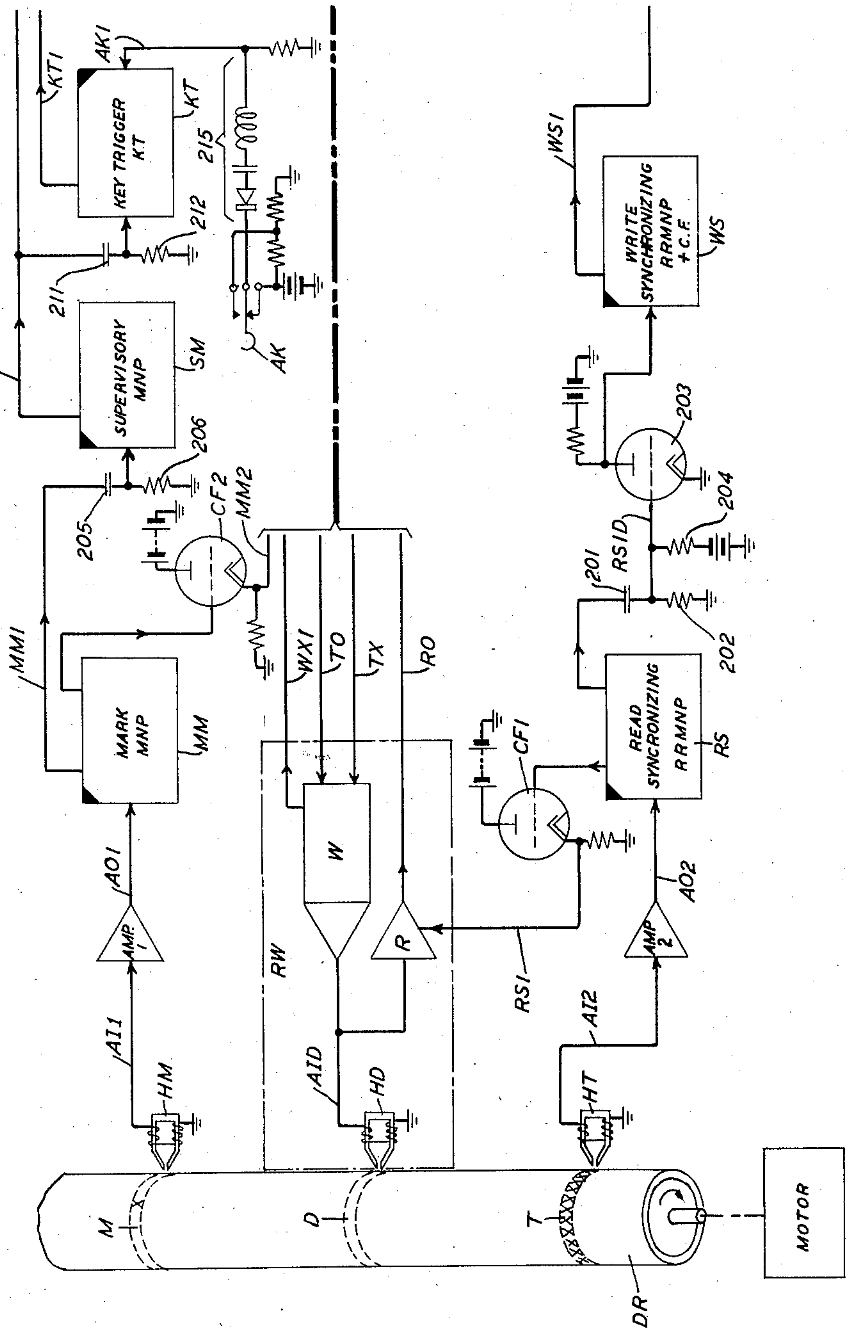
Fig. 1 shows the manner in which Figs. 2 and 3 of the drawings should be oriented with respect to one another.
Figs. 2 and 3 represent, partially in block schematic form, a first embodiment of the invention, capable of performing an "add one" operation.
Figure 3:
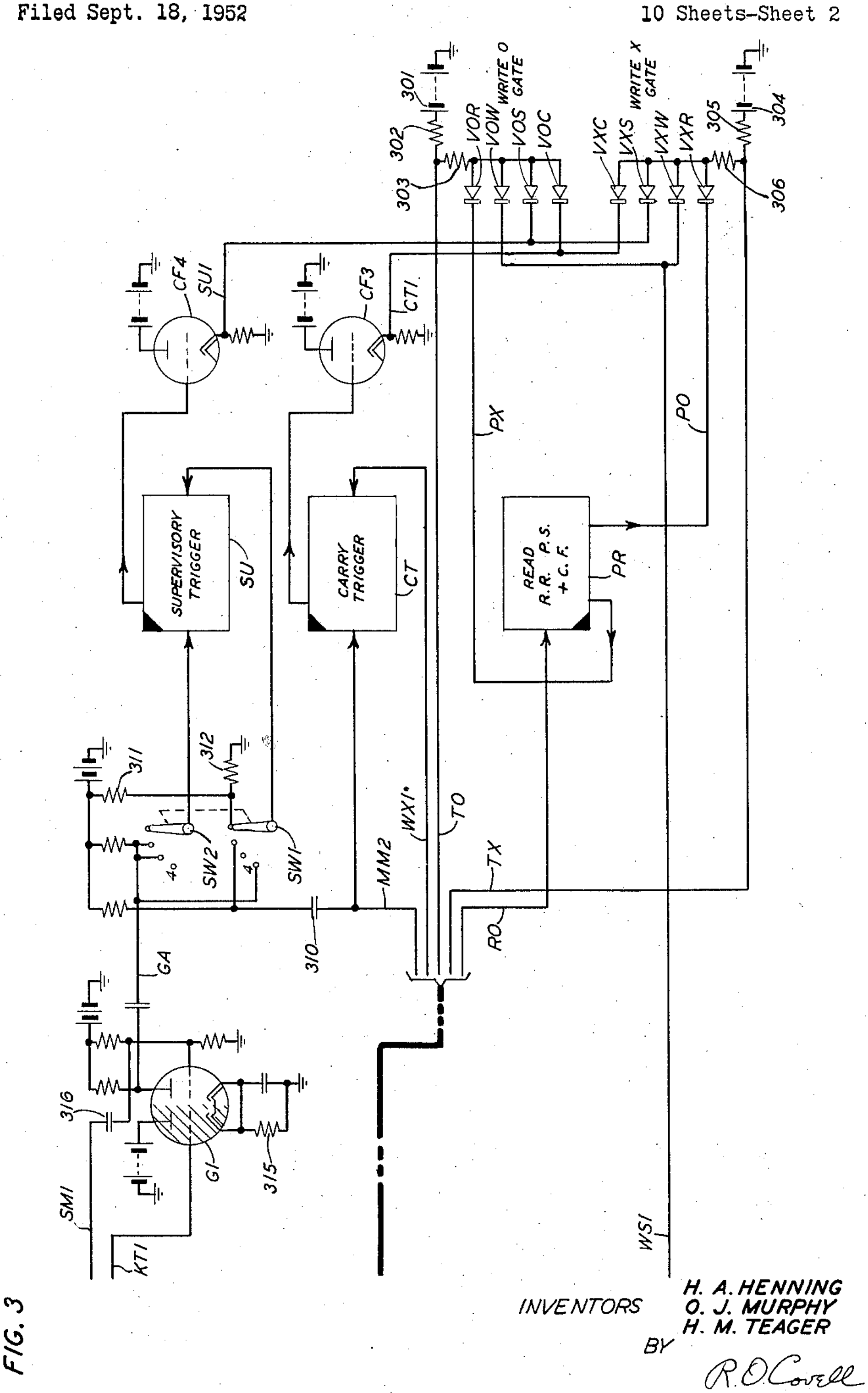
Figures 5, 6:
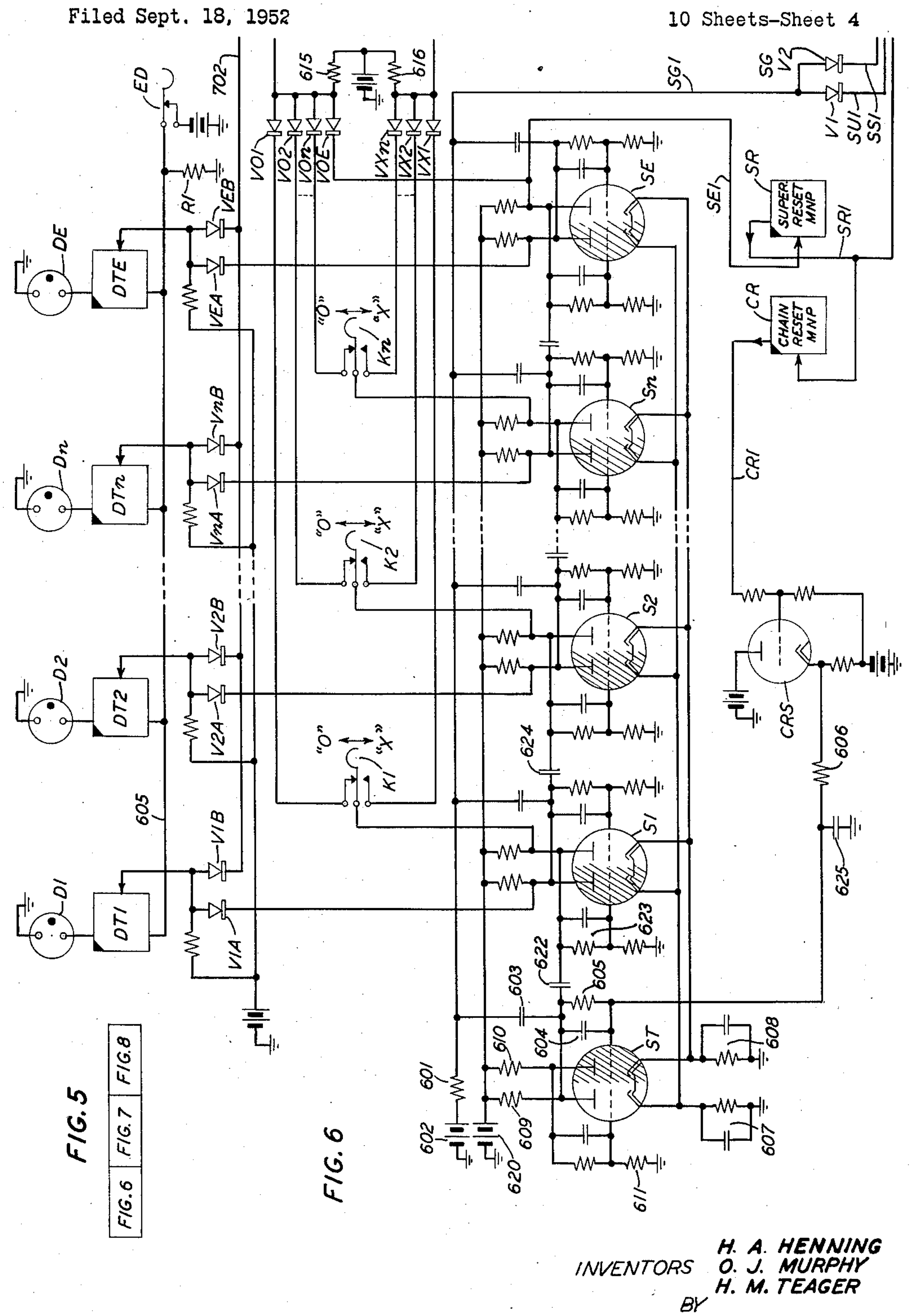
Fig. 5 shows the manner in which Figs. 6 to 8 of the drawings should be oriented with respect to one another.
Figs. 6 to 8 represent, partially in block schematic form, a second embodiment of the invention, capable of performing the mathematical operations of addition or subtraction.
Figure 7:
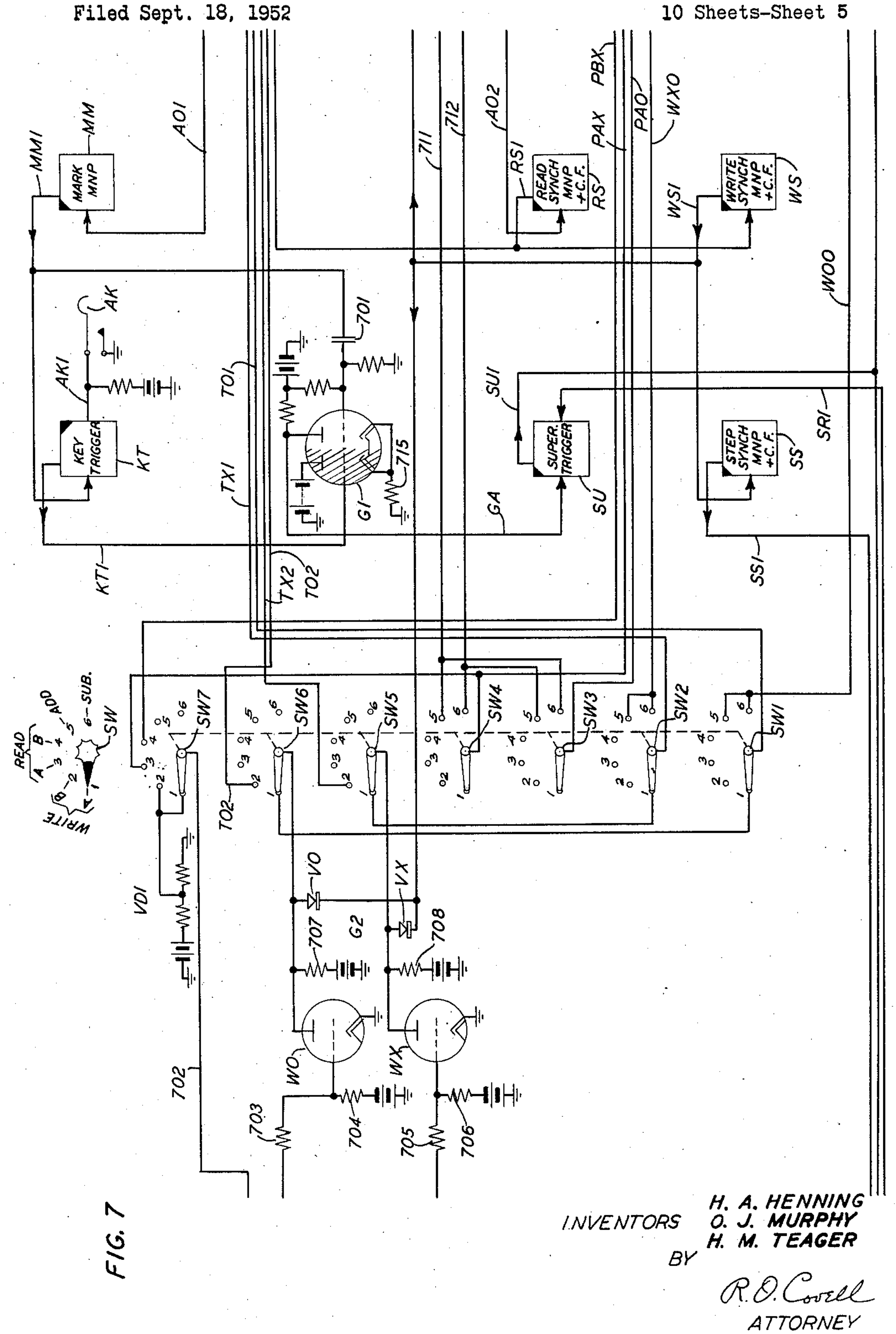

Two forms of magnetic-drum computers are disclosed, constituting preferred embodiments of the invention. The first of these forms, shown in Figs. 2 and 3, is capable of reading a number, represented in binary form and recorded on a revolving magnetic drum, of adding one to that number, and of recording the result on the magnetic drum, i. e., it is a counter. The second of these forms, shown in Figs. 6 to 8, is capable of writing a first number in binary form in one channel or track of a magnetic drum, of writing a second number in binary form on a second channel or track of the magnetic drum, of adding the second number to the first number or of subtracting the second number from the first number, of recording the sum or difference in the same channel or track as the first number was written, thus obliterating the previous contents, and of displaying the contents of either channel or track either before or after the mathematical operation has been performed.

In general, in both of these forms a magnetic surface is rapidly moved in relation to one or more magnetic heads. Each such head comprises a core of magnetizable material and a coil surrounding a portion of that core. If a pulse of current is passed through the coil, the area of the surface then under the head, herein labeled an "area," an "elemental area" or a "cell," will be appropriately magnetized. When that magnetized elemental area is subsequently moved past the head, a voltage will be induced in the coil which may cause a flow of current in an external circuit. The voltage or current may be employed as an output indication of the fact and nature of the magnetization. Since the input current pulse may be of either polarity, a given area of the moving surface may be magnetized in either of two polarities, thereby providing output current or voltage pulses of either of two characteristic forms. Consequently, any item of information which can be represented by one of two conditions, herein designated "X" and "O," may be recorded on and read from an elemental area or "cell" on the moving surface.

Figure 8:
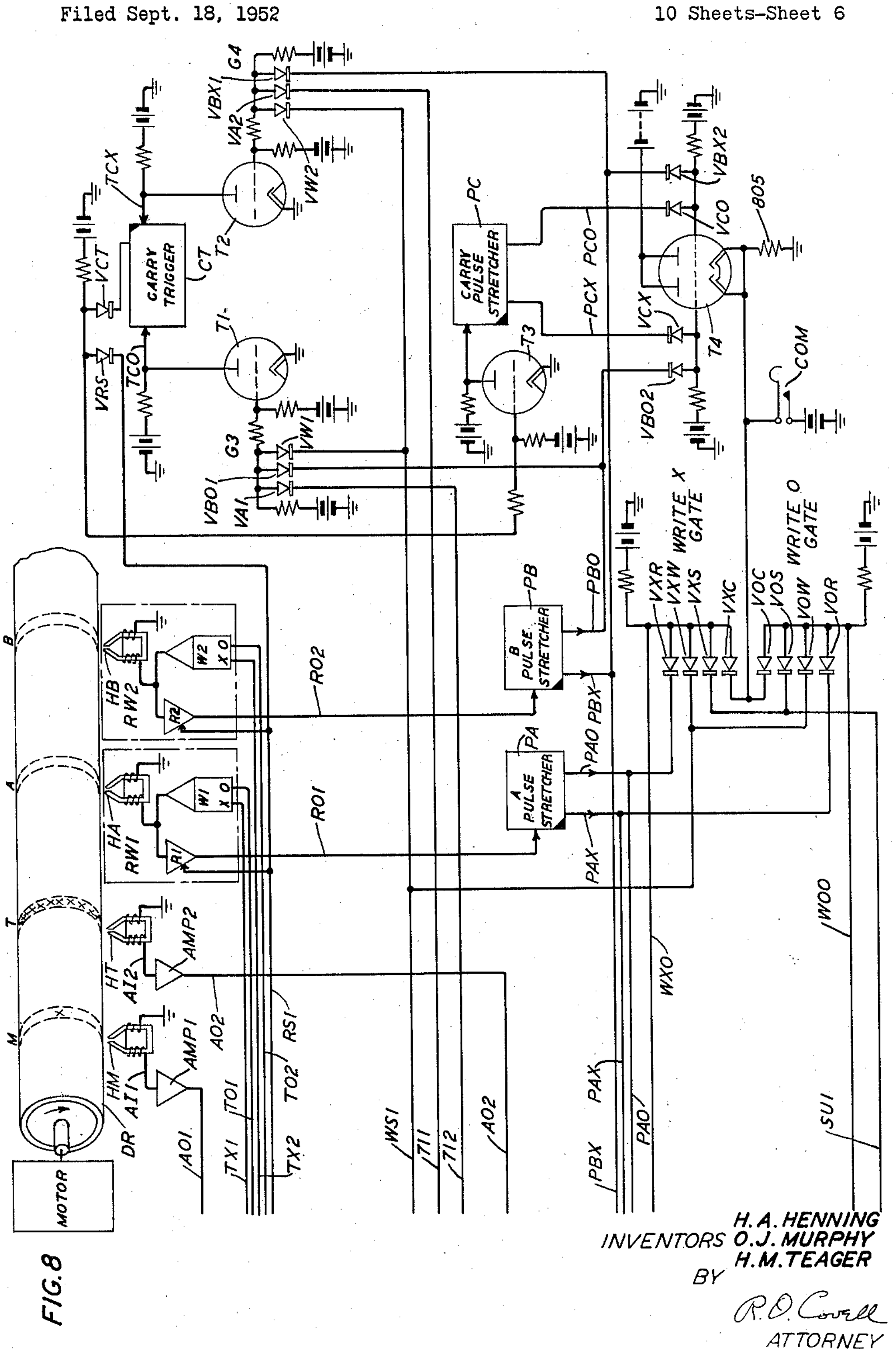

Thus, referring to Figs. 2 and 8 of the drawings, a circular cylindrical drum DR(2) or DR(8) is rotated by means, not shown, at high speed about its longitudinal axis. The surface of the drum DR(2) or DR(8) is coated or otherwise provided with a layer of magnetizable material. A plurality of magnetic heads such as heads HM(2), HD(2) and HT(2) or heads HM(8), HT(8), HA(8) and HB(8) are placed in spaced proximity to the revolving surface, the area of the surface which passes under any one of the heads being in the form of an annulus hereafter referred to as a track, having a width determined by the effective size of the head and having a length equal to the circumference of the drum.

Additional details as to the construction of suitable magnetic drums and magnetic heads are presented in the patent application of Brooks-Lovell-McGuigan-Murphy-Parkinson, Serial No. 183,636, filed September 7, 1950, now Patent 2,764,634 granted September 25, 1956, in the patent application of McGuigan-Murphy-Newby, Serial No. 201,156, filed December 16, 1950, now Patent 2,700,148 granted January 18, 1955; and in the patent application of Cornell-McGuigan-Murphy, Serial No. 307,108, filed August 29, 1952, the disclosures of all of which are incorporated herein by reference.

Additionally, each of the preferred embodiments of the invention utilizes certain basic elements or components capable of performing certain fundamental functions. These elements are represented in block diagrammatic form in Figs. 2, 3 and 6 to 8 and the details of the circuits comprising those elements are disclosed in Figs. 9 to 14 of the drawings. Therefore, prior to discussion of the nature and operation of the preferred embodiments of the invention, the details of suitable component elements will be described.

Each of the heads HM(2) to HT(2) and HM(8) to HB(8) is provided with amplifying means individual thereto. Since it is assumed that certain information is permanently recorded in track M(2) individual to head HM(2), in track M(8) individual to head HM(8), in track T(2) individual to head HT(2) and in track T(8) individual to head HT(8), heads HM(2), HT(2), HM(8) and HT(8) need only perform a reading function. Consequently the amplifiers AMP1(2), AMP2(2), AMP1(8) and AMP2(8) only need be capable of amplifying a reading indication.

Figures 10, 10A, 11, 11A, 12, 12A:
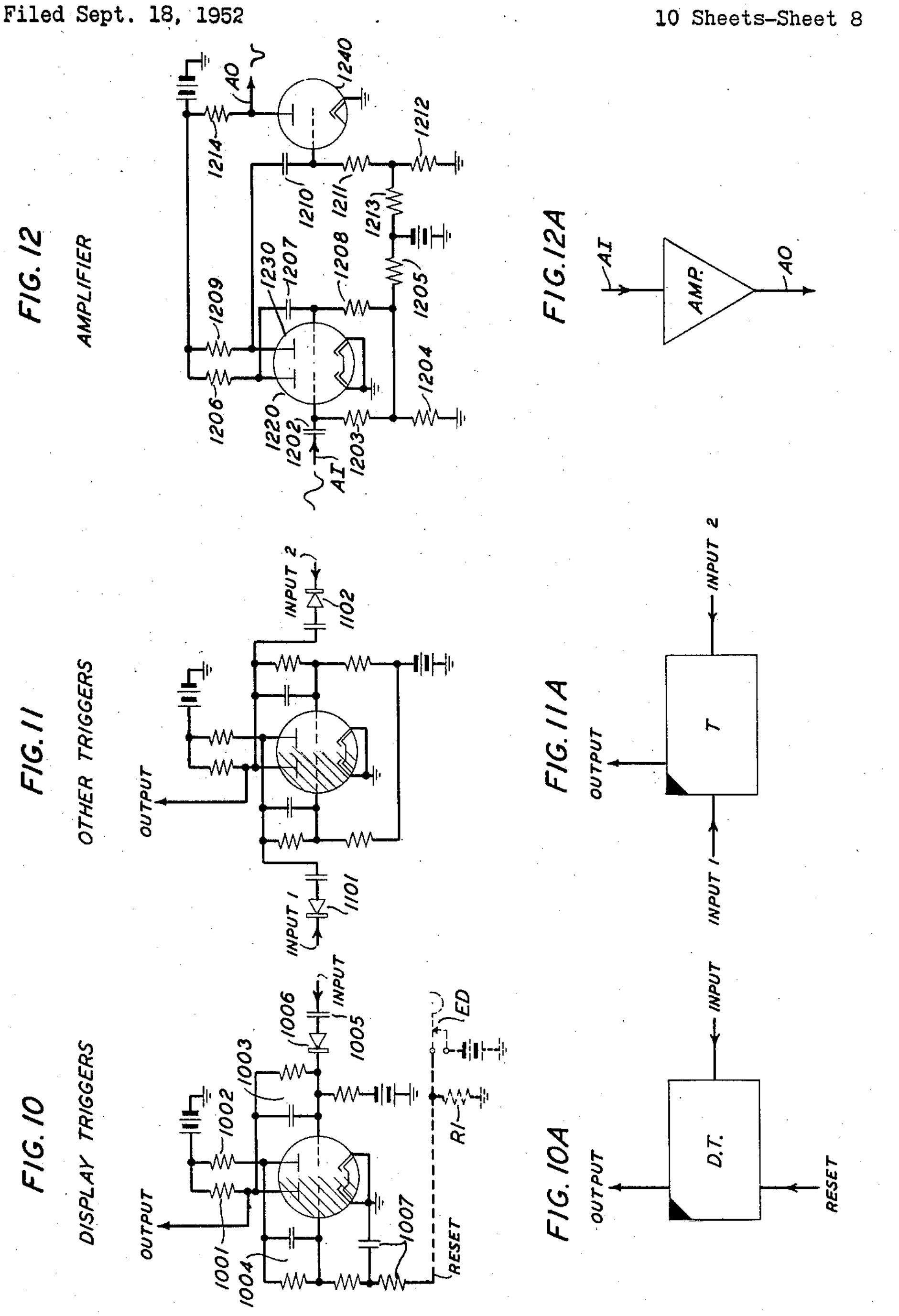

Amplifiers AMP1(2), AMP2(2), AMP1(8) and AMP2(8) are again represented in Fig. 12A and are shown in detail in Fig. 12. In all cases, the input lead from the associated head to the amplifier is denoted AI and the output lead from each amplifier is denoted AO.

The input wave form on conductor AI resulting from the passage of a magnetized spot on the drum DR(2) or DR(8) past head HM(2), HT(2), HM(8) or HT(8) is shown to the left of lead AI in Fig. 12. The nature of this wave form is more fully described in the above-cited application of Cornell et al. This input pulse is applied through capacitor 1202 to the grid of triode 1220. To bias this tube, the grid thereof is connected by resistor 1203 to a point on the potential divider comprising resistors 1204 and 1205. The anode of tube 1220 is connected to a source of positive potential through load resistor 1206. Tube 1220 is coupled to triode 1230 by means of capacitor 1207, and tube 1230 is suitably biased by means of resistors 1208, 1204 and 1205. The change in potential at the anode of tube 1230 resulting from the potential drop across its load resistor 1209 is applied through capacitor 1210 to the grid of triode 1240. Tube 1240 is suitably biased at or beyond cutoff by connecting the grid thereof through resistor 1211 to a point on the potential divider comprising resistors 1212 and 1213. The output potential at the anode of tube 1240, as a result of the potential drop across load resistor 1214 is applied to output lead AO. The output wave form is represented to the right of conductor AO in Fig. 12 and consists of an enlarged and inverted version of the upper part of the first lobe of the input signal.

Thus, as a result of the passage of a magnetized area past head HM(2) or HM(8) a negative-going output pulse will be applied to conductor AO1(2) or AO1(8), and as a result of the passage of a magnetized area past head HT(2) or HT(8) a negative-going output pulse will be applied to conductor AO2(2) or AO2(8). Since track M of drum DR(2) or DR(8) is assumed to have but one magnetized spot on its surface and track T of drum DR(2) or DR(8) is assumed to have each cell thereof suitably magnetized to produce an output indication, a negative-going pulse will be applied to conductor AO1(2) or AO1(8) every revolution of drum DR(2) or DR(8) and a negative-going pulse will be applied to conductor AO2(2) or AO2(8) each time an elemental area or cell passes head HT(2) or HT(8).

While one suitable method of deriving "mark" pulses and applying them to conductor AO1(2) or AO1(8) and for deriving "timing" pulses and applying them to lead AO2(2) or AO2(8) is shown herein, other methods may be employed. For example, these pulses may be derived in the manner shown in the above-identified application of McGuigan et al.

Figures 9, 9A:
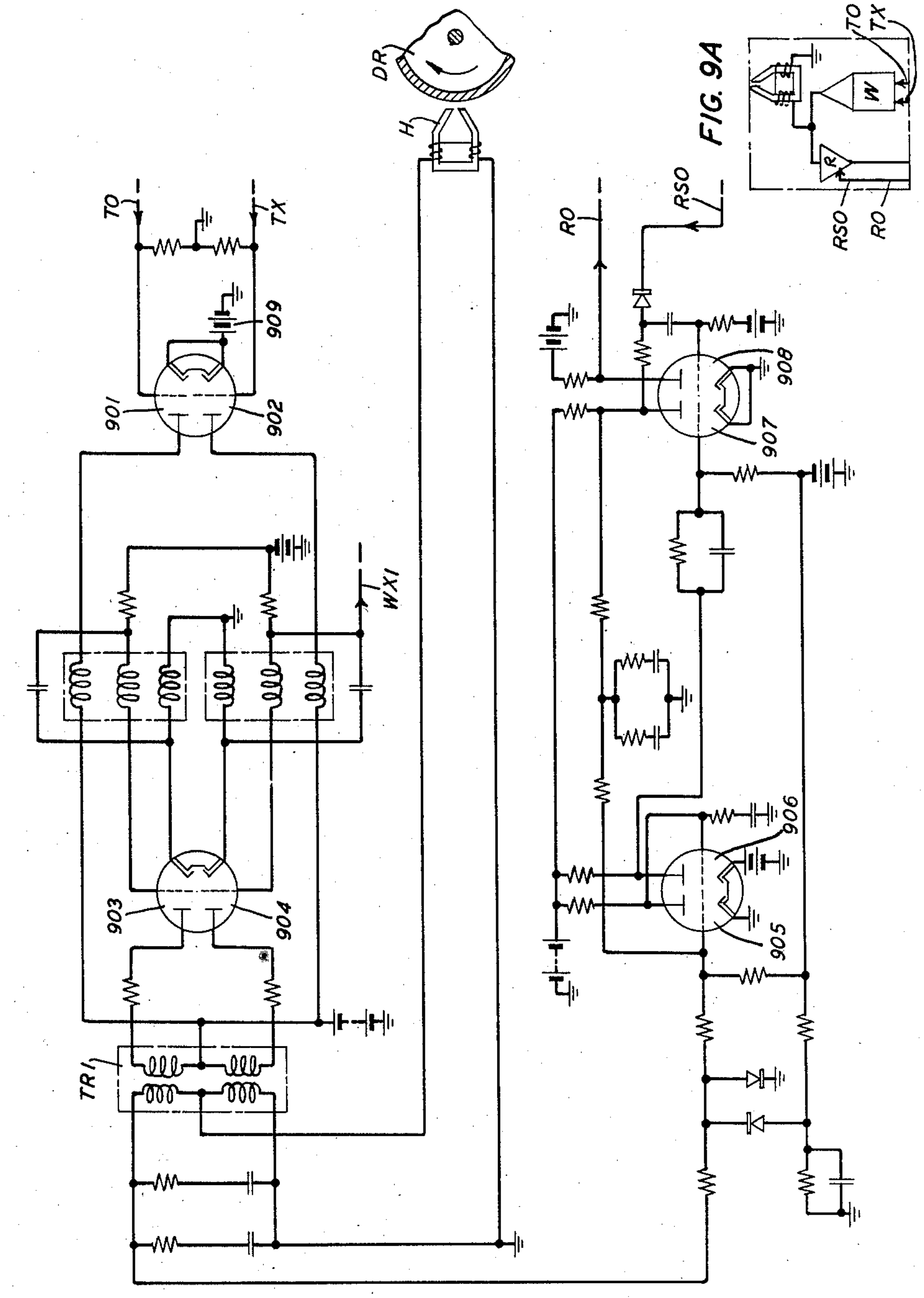
Figs. 9 to 14 show the details of certain of the circuits represented by block diagrams in Figs. 2, 3 and 6 to 8.

Since heads HD(2), HA(8) and HB(8) must be capable of performing both a reading and a writing operation, as will be seen hereinafter, the amplifier individual thereto must be capable of amplifying both reading and writing pulses. The entity comprising the head HD(2), HA(8) or HB(8) and its associated reading amplifier R(2), R1(8) or R2(8) and its associated writing amplifier W(2), W1(8) or W2(8) is represented by block RW(2), RW1(8) or RW2(8) and these blocks RW are again represented in Fig. 9A. The elements and circuitry comprising such a block RW are shown in Fig. 9 and drum DR(2) or DR(8) is again partially represented as drum DR(9).

In general, a positive-going input "write" pulse on the "trigger O" lead TO(9) or the "trigger X" lead TX(9) actuates, through gate 901 or 902, a normally quiescent blocking oscillator circuit comprising tube 903 or 904. Output conductor WX1 is connected to a point in the "X" blocking oscillator circuit comprising tube 904 for a purpose hereinafter to be described. The output at the anode of the blocking oscillator is applied through transformer TR1(9) to the coils of head H(9) whereby an "O" or an "X" is recorded on the surface of the revolving drum DR(9). During the reading operation, the signal induced in the coils of head H(9) as a result of the passage thereby of a magnetized area on drum DR(9) is applied by transformer TR1(9), acting as an autotransformer, to the reading amplifier circuit comprising tubes 905 to 908. If an "O" is read, no output signal will appear on the output lead RO(9). If, however, an "X" is read, a negative-going square wave pulse will be transmitted over conductor RO(9) if a positive square wave "read-synchronizing" pulse is received on conductor RSO(9) concurrently with the performance of the reading operation. The relationship between the "read-synchronizing" and the "write" pulses is such that they are non-overlapping in time; they are so controlled by circuits external to the read-write amplifier that the reading operation occurs when the initial portion of any given cell comes under the head H(9) and the writing operation occurs when the cell becomes centered under the head H(9). Consequently the amplifier is capable of reading the contents of a cell and writing in that cell on the same pass of the cell. The operation of the read-write amplifier represented in Fig. 9 is described in detail in the above-identified application of Cornell et al.

Another circuit element which is employed as an element of the above apparatus is that which will herein be called a "trigger" or "trigger circuit," also variously known as a "flip-flop" or a "bistable multivibrator." One type of such trigger circuit is employed for the display triggers DT1(6), DT2(6) . . . DT*n*(6) and DTE(6), generally identified as display triggers DT. These display triggers, again represented in block form in Fig. 10A and shown in detail in Fig. 10, are conventional forms of modified Eccles-Jordan trigger circuits well known in the art.

Each display trigger DT comprises a pair of triodes each having a grounded cathode and an individual load resistor 1001 or 1002. A cross-coupling network 1003 or 1004 is provided between the anode of each tube and the control grid of the other tube. The display triggers DT are provided with a single input and a single output, with the bias on the grid of the left-hand section being so controlled as to serve as a resetting means. Thus, as is represented in detail in Fig. 6 and shown in dotted lines in Fig. 10, the control grid of the left-hand section of the trigger tube is connected via a resistance and a smoothing network 1007 to ground through a resistor R1 and is normally connected to a source of negative potential through key ED.

Momentary opening of key ED will so change the bias on the left-hand section of the trigger tube as to insure that it becomes conductive; as a consequence of this action the right-hand section is biased below cut off. This "off" or normal condition is indicated in the block schematics of Figs. 6 and 10A by the shaded portion, which represents the section which is conducting. With switch ED in its normally closed condition, the application of a positive-going pulse through capacitor 1005 and varistor 1006 to the grid of the right-hand section of the trigger tube will render that section conductive and, by virtue of the action of the cross-coupling networks 1003 and 1004, the left-hand section will become nonconductive. Varistor 1006 is so poled as to pass only positive input signals. As a result of this change of state of the trigger circuit the output potential will rise from a low positive value to a substantially higher positive value and will there remain until resetting occurs. In the circuit of Fig. 6, the output conductor from display triggers DT1(6) to DTE(6) is connected to one electrode of an individual gaseous discharge diode D1(6) to DE(6), the other electrode of which is grounded. When the display trigger is in its normal condition all of the indicators D1(6) to DE(6) are extinguished; when any of the display triggers DT1(6) to DTE(6) are triggered to their other stable state, the associated indicators D1(6) to DE(6) will exhibit an ionized discharge and perceptibly glow.

Another form of trigger circuit is used as the key trigger KT(2), as the key trigger KT(7), as the supervisory trigger SU(3), as the supervisory trigger SU(7), as the carry trigger CT(3) and as the carry trigger CT(8). These triggers, again represented in block form in Fig. 11A and shown in detail in Fig. 11, are also a conventional form of modified Eccles-Jordan trigger circuit. Here, however, there are dual inputs, input 1 and input 2, and the varistors 1101 and 1102 in the input circuits are so poled as to pass only negative input signals. The two sections of the trigger tube are symmetrical but the left-hand section is shown as "normally" conducting wherefor the right-hand section is then normally non-conducting. This "normal" condition of the trigger circuit is purely a matter of convenience in description and is not a matter of circuit design of the trigger itself. It does, however, represent the condition that usually obtains during quiescent periods of system operation. This "normal" condition is indicated in the block schematics by the shaded portion, which represents the section which is conducting. A negative pulse applied to input 2 at this time will produce no change in the trigger circuit. However, upon the application of a negative pulse to input 1, the state of the trigger circuit will be shifted whereby the right-hand section will be rendered conductive and the left-hand section driven below cut off whereupon the output potential will rise from a low positive value to a much higher positive value. The trigger will remain in this condition until a negative pulse is applied to input 2 at which time the trigger will be restored to normal and the output potential will revert to its initial value. Thus, upon the alternate application of negative pulses to inputs 1 and 2, a positive square wave pulse will be produced at the output, the duration of that pulse being controlled by the time spacing between the two input pulses.

Figure 13:
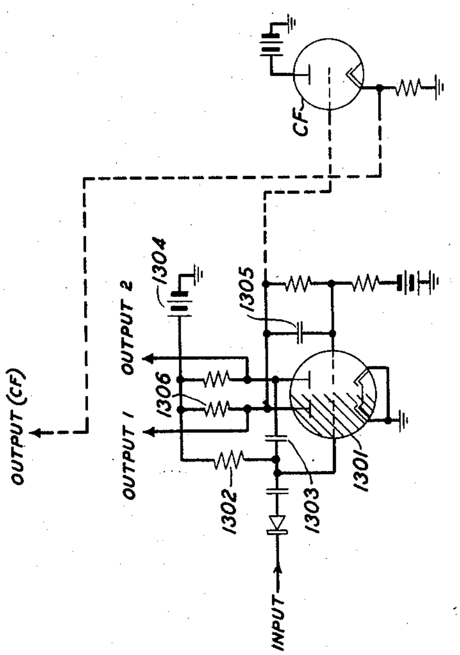
Figure 13A:
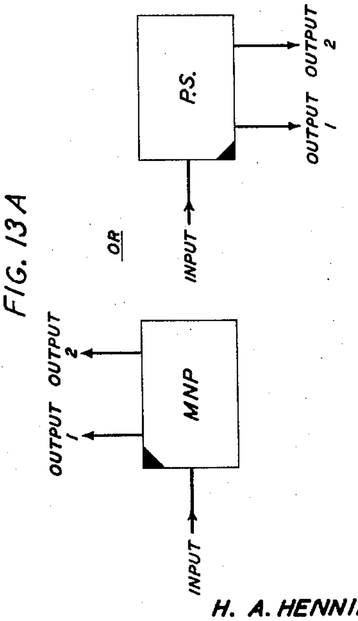

Another major element which is represented by block schematics in Figs. 2, and 6 to 8 may be accurately labeled herein a "monopulser" or a "pulse stretcher" depending upon its particular function. This device, again represented in block schematic form in Fig. 13A and shown in detail in Fig. 13, is a conventional form of the so-called single-shot multivibrator, i. e., it is a device which when triggered will complete one cycle of operation. In this case there is a circuit dissymmetry and after a prolonged absence of input pulses the left-hand section of tube 1301 will be conducting. Application of a single negative pulse to the input terminal will cause the right-hand section to become conductive and the left-hand section non-conductive. After a time interval determined by the circuit parameters the circuit will restore to its initial condition. As a result, a square wave pulse will be transmitted as an output signal, a positive-going pulse being transmitted over output conductor 1 and a negative-going pulse being transmitted over output conductor 2. Since the device is operative to transmit one square wave pulse for each input pulse, it may reasonably be labeled a "monopulser." Since the duration of that output pulse may be accurately controlled by adjustment of the circuit parameters, particularly of resistor 1302 and capacitor 1303, and may, if desired, be made longer than the input pulse, it may also be labeled a "pulse stretcher." Each of the ones of these devices appearing on Fig. 8 of the drawings so functions as most accurately to be labeled a "pulse stretcher" while each of those appearing on Figs. 2, 6 and 7 so functions as properly to be labeled a "monopulser."

Under some circuit impedance conditions, it may be desirable to apply the output of a pulse-stretcher or monopulser through a cathode follower. In the circuits of Fig. 7 a monopulser which utilizes a cathode follower output is labeled "*MNP+CF*," and whenever such a designation occurs, it is to be understood that the block represents the circuit of Fig. 13 including the cathode follower tube CF(13), the connection between output conductor 1 and the grid of tube CF(13), and the output conductor "output (CF)" connected to the cathode of tube CF(13).

Figure 14:
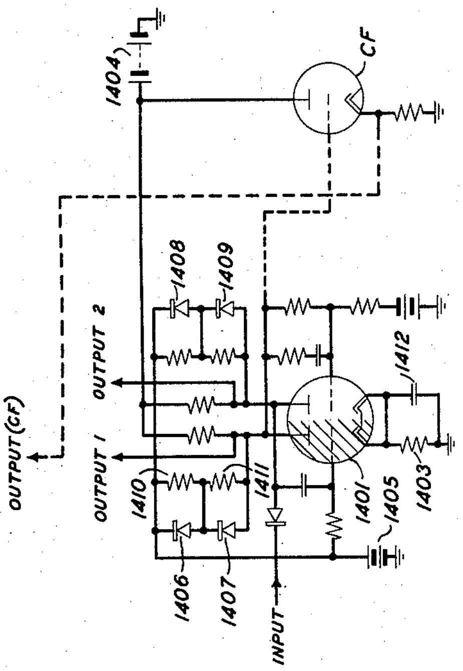
Figure 14A:
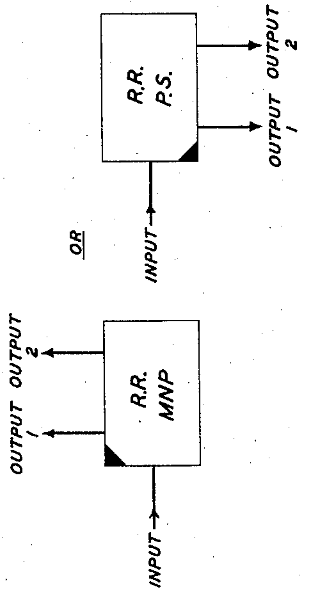

Another circuit element which is employed in the embodiment of the invention shown in Figs. 2 and 3, herein labeled a "rapid-rise monopulser" or a "rapid-rise pulse-stretcher," depending on its function, is again represented in block schematic form in Fig. 14A and is shown in detail in Fig. 14. Basically this circuit is identical to the monopulser circuit shown in Fig. 13 except for the addition of cathode bias to reduce the downward voltage excursion of the anodes, an increase in the B+ supply voltage and the provision of output voltage limiters. Resistor 1403, common to the cathodes of both of the sections of tube 1401, provides cathode bias and is shunted by a capacitor 1412 to avoid undesirable high-frequency feedback action.

The primary reason for the use of the modified form of monopulser shown in Fig. 14 is to provide a rapid rise of the output signal to its peak voltage. In the case of the monopulser shown in Fig. 13, when the left-hand section of tube 1301 is driven below cut-off, the output voltage at the anode of that section will not approximate the potential of the B+ supply 1304 immediately, but will rise exponentially and approach that potential asymptotically due to the charging of capacitor 1305 and other unavoidable parasitic capacities, not indicated on the drawing, through resistor 1306. Obviously, the potential at the anode of the left-hand section of tube 1301 could be made to rise to this same potential much more rapidly if the potential of source 1304 were increased, i. e., a more linear portion of the timing exponential curve would be utilized. Such has been done in the circuit of Fig. 14. Potential source 1404 is of a considerably higher value than potential source 1304, e. g., twice the potential of source 1304, while potential source 1405 may be assumed to have the same voltage value as potential source 1304. Therefore, while the voltage at the anode of the left-hand section of tube 1401 will rise exponentially to approach the potential of source 1404 asymptotically, it will reach the lower requisite output voltage (e. g., the voltage of source 1405)

very much more rapidly. However, it may be desirable or necessary to limit the peak value of the output signal to approximately that of source 1405 and this may be accomplished by connecting the anodes of tube 1401 to this source 1405, which supplies a voltage equal to that of source 1304, through properly poled varistors 1406 to 1409. With this arrangement, whenever the voltage at the anode of the left-hand section, for example, of tube 1401 begins to exceed the supply voltage 1405, varistors 1406 and 1407 assume a low impedance condition, effectively limiting the maximum voltage at that anode to the voltage of source 1405. Two varistors such as 1406 and 1407 have been shown serially connected merely because the allowable back-voltages of commercially available varistors are frequently insufficiently high to permit but one such device to be used with the voltages of source 1405 normally employed. Further, since there are frequently substantial variations in the effective back-resistance of commercially available varistors, a voltage equalizing resistor such as resistor 1410 or 1411 should be inserted in parallel with each of the varistors.

One or both of the outputs of the rapid-rise monopulser may be applied through cathode followers if required, and Fig. 14 shows, by way of example, a cathode follower CF connected in the circuit of output 1. If no cathode follower is included in the circuit represented by the block schematic, the designation on that block will merely read "RR MNP." The read synchronizing rapid-rise monopulser RS(2) is so represented. If all utilized outputs are provided with cathode followers, the designation on the block schematic will read "RR MNP+CF" or "RR PS+CF." Thus, the write synchronizing rapid-rise monopulser WS(2) is designated "RR MNP+CF" and its sole output, output 1, is provided with a cathode follower. The read rapid-rise pulse-stretcher PR(3) is designated "*RR PS+CF*" and each of its two outputs is provided with an individual cathode-follower stage.

In general, there are two fundamentally different methods of dealing with data in magnetic drum recorders, counters or computers: one is the simultaneous or "parallel" presentation, where all digits of a number or a "word" are available at the same instant, though recorded in different tracks; the other is the sequential or "serial" presentation, wherein successive digits of a number or "word" are presented sequentially in time, being recorded in a single track. The latter method is employed in both of the preferred embodiments of the invention herein disclosed.

Before considering the operation of the "add one" system disclosed in Figs. 2 and 3 of the drawings, an analysis of the logic required to perform the "add one" operation will be presented.

Let it be assumed that an arbitrary number is represented in binary notation on the magnetic drum by a sequence of magnetic spots or cells and that the number is arranged in time in ascending powers of the digit "2." In what follows, the binary value "zero" will be called an "O" while the binary value "one" will be called an "X." If the digit "one" is to be added to that number, due to the serial nature of the stored information, decisions about changing the digits of the number must be made digit by digit rather than simultaneously. At each digit then, four possibilities are presented: there is either an "O" or an "X" in the digit, and an "X" either has or has not been carried from the previous digit.

If an "X" has not been carried from the previous digit, subsequent digits are left unchanged; if an "X" has been carried, the inverse of the digit is written. When an "O" is changed to an "X," no further "X" is carried.

These then are the decisions required by the circuitry: "change what is read" in a particular digit place until an "O" has been changed to an "X"; leave all subsequent digits alone.

Referring now to Figs. 2 and 3 of the drawings, in accordance with the foregoing discussion (made with reference to the detailed drawing of Fig. 9) of the operation of the read-write amplifier RW(2), when a positive-going writing pulse is applied to conductor TO, an "O" will be written in the cell then under head HD(2) and when a positive-going writing pulse is applied to conductor TX, an "X" will be written in that cell. Whether a writing pulse is or is not applied to conductor TO or TX is controlled by the Write O or Write X gate, respectively, of Fig. 3. Each of these gates comprises a plurality of varistors VOR(3) to VOC(3) or VXR(3) to VXC(3), respectively, these groups of varistors being so arranged as to form a conventional "and" gate. Thus a positive potential is applied to one terminal, the "anode" terminal, of each of the varistors VOR(3) to VOC(3) by means of positive battery 301, and resistors 302 and 303; and a positive potential is applied to one terminal, the "anode" terminal, of each of the varistors VXR(3) to VXC(3) by means of positive battery 304, and resistors 305 and 306. The other terminal, the "cathode" terminal, of each of the varistors VOR(3) to VOC(3) and VXR(3) to VXC(3) is connected to a source of potential which normally is considerably less positive than that applied to its "anode" terminal, and also somewhat less than that of positive battery 909 in the read-write amplifier. Therefore, the potential on conductor TO or TX will be held to its normal value as long as the potential applied to the "cathode" terminal of any one of the varistors comprising the Write O or Write X gate, respectively, remains at its normal value; it is only upon the concurrent application of an increased potential to the "cathode" terminals of all of the varistors comprising the "and" gate that the potential on the output conductor TO or TX can rise. Each of the gates Write O and Write X therefore coordinates four controls: a write synchronizing control, a "change-what-is-read" control, a supervisory control and a carry control.

Figure 4:
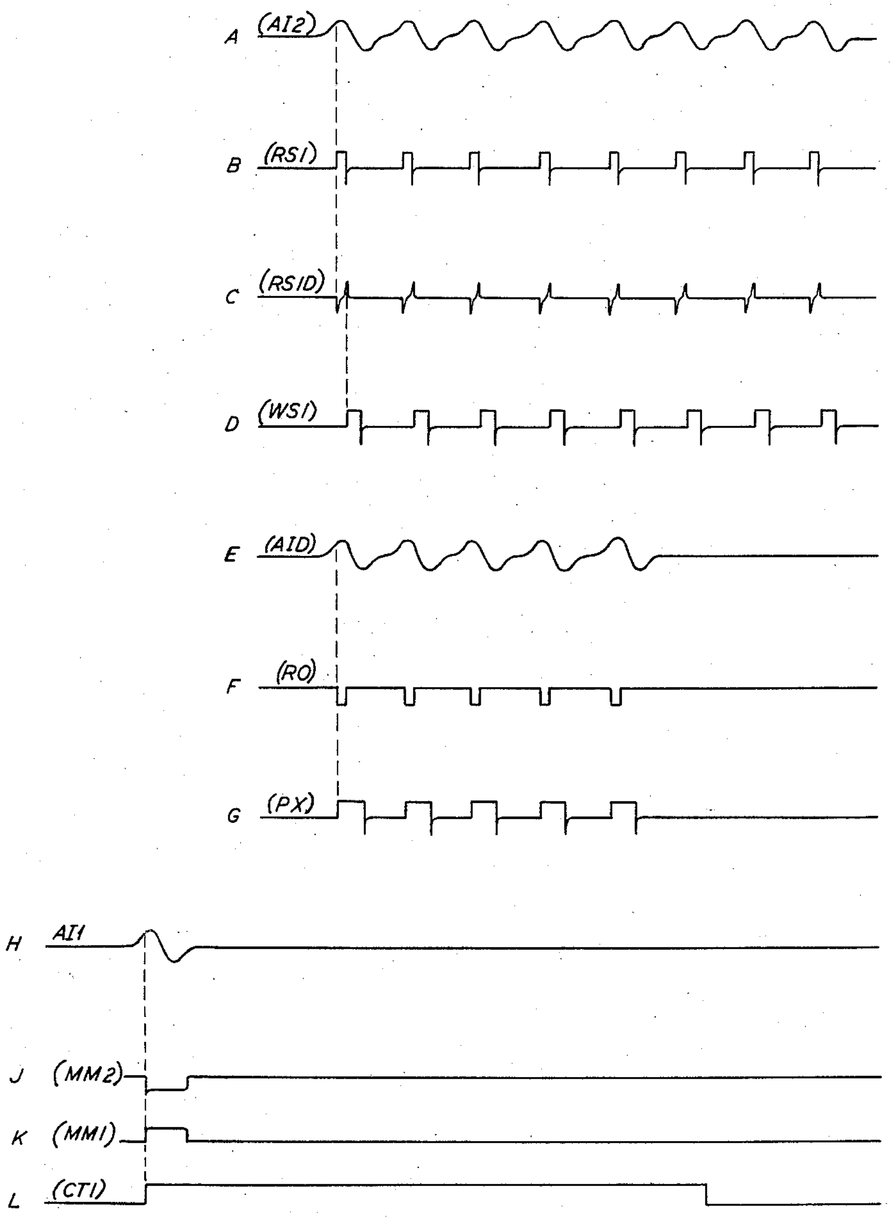
Figs. 4A to 4L are a series of curves representing current or voltage conditions at certain points in the circuits shown in Figs. 2 and 3.

The write synchronizing control is derived from the timing track T(2) on drum DR(2). Since an "X" is assumed to be written in each cell on track T(2), at the passage of each cell past head HT(2), a pulse will be applied via conductor AI2 to amplifier AMP2(2). This series of pulses on conductor AI2 is represented in Fig. 4A. Each of these pulses is amplified by amplifier AMP2(2) whose output, a negative-going pulse, is applied via conductor AO2 to the read synchronizing rapid-rise monopulser RS(2), which is normally conducting on its left-hand section. The negative-going leading-edge of each of these pulses will trigger monopulser RS(2) to the right. Monopulser RS(2) will restore to normal after a period determined by the parameters of the monopulser circuit, e. g., assuming a 16-microsecond cell interval, two microseconds might be a reasonable choice. Consequently, a series of positive-going essentially square wave pulses will be applied through cathode follower CF1(2) to output conductor RS1, one pulse per cell. This series of pulses is represented in Fig. 4B.

The negative-going pulses from the other output of monopulser RS(2) are differentiated by the network comprising capacitor 201 and resistors 202 and 204 and applied via conductor RS1D to the grid of amplifier 203. Resistors 202 and 204 are chosen such that tube 203 is biased near cutoff. The output of tube 203 is connected to write synchronizing rapid-rise monopulser WS(2). The negative-going portion of each of the differentiated input pulses on conductor RS1D, represented in Fig. 4C of the drawings, will further increase the cutoff bias on tube 202 and thus have no effect on monopulser WS(2). The positive-going portions, however, which occur in step with the trailing edge of the RS1 pulses, will trigger monopulser WS(2) to the right. Monopulser WS(2) will restore to normal after a period determined by the parameters of the monopulser circuit, e. g., three or four microseconds. A series of positive-going essentially square wave pulses, one pulse per cell, will be applied through a cathode follower to output conductor WS1. This series of pulses is represented in Fig. 4D. These pulses on conductor WS1 are applied to varistor VOW(3) of the Write O gate and to varistor VXW(3) of the Write X gate. If all others of the varistors VOR(3), VOS(3) and VOC(3) of the Write O gate are enabled at this time, the pulse on conductor WS1 will be passed by the Write O gate and applied to conductor TO whereupon the read-write amplifier RW(2) will write an "O" in the cell; if, on the other hand, all others of the varistors VXC(3), VXS(3) and VXR(3) of the Write X gate are enabled at this time, the pulse on conductor WS1 will be passed by the Write X gate and applied to conductor TX whereupon the read-write amplifier RW(2) will write an "X" in the cell. It will presently be seen that these actions are mutually exclusive.

The "read-synchronizing" pulses on conductor RS1 are applied to the reading amplifier R(2) of the read-write amplifier RW(2). By virtue of the relation existing between the location of a cell in track T(2) and a cell in track D(2), head HD(2) will be reading the contents of a cell at the time that the read-synchronizing pulse is applied to reading amplifier R(2). The output of head HD(2) as applied to conductor AID, assuming a series of "X's" to be recorded in the cells, is shown in Fig. 4E. Therefore, as hereinbefore described, if an "O" is read in the cell, the potential on output conductor RO will remain unchanged, but if an "X" is read in the cell, a negative-going pulse will be applied to conductor RO. A series of such pulses on conductor RO, again assuming that a series of "X's" is read, is shown in Fig. 4F.

It may be noted at this point that the apparatus comprising head HT(2), amplifier AMP2(2), read-synchronizing monopulser RS(2), cathode follower CFI(2), the differentiating circuit comprising capacitor 201 and resistors 202 and 204, amplifier 203, and the write-synchronizing monopulser WS(2) constitutes a "cell definition circuit" in that it serves to define the location of the cells in track D, the "working" track on the drum, through the medium of the read-synchronizing and the write-synchronizing pulses.

The pulses on conductor RO are applied to the read rapid-rise pulse-stretcher PR(3), each of the pulses triggering read pulse-stretcher PR(3) through one cycle of operation. Both output 1 and output 2 of pulse-stretcher PR(3) are provided with cathode followers. Therefore, at each reading of an "O," output conductor PX will remain at a relatively low positive potential, disabling the Write O gates, and output conductor PO will remain at a relatively high positive potential, partially enabling (i. e., removing one diode constraint) the Write X gate. If an "X" is read, a pulse will be received via conductor RO (Fig. 4F), read pulse-stretcher PR(3) will be triggered through one cycle of operation, the potential on output conductor PX will rise to a higher positive value for a preselected period, e. g., 6 microseconds, and conductor PO will fall to a relatively low positive value for the same period. Therefore, the Write O gate will be partially enabled and the Write X gate will be disabled for the duration of each of these pulses. Fig. 4G represents the pulses on conductor PX, assuming a series of "X's" to have been read.

The apparatus comprising the read-write amplifier RW(2) (or portions thereof) and the read pulse-stretcher PR(3) constitutes a reading means or a reading circuit, operative under the control of the cell defining circuit to read the contents of the cells of track D(2) of drum DR(2).

It will therefore be seen that the operation of the read rapid-rise pulse-stretcher PR(3), in cooperation with the Write O and Write X gates, complies with the previously set forth rules of operation: whatever is read is changed, with a terminating limitation hereinafter to be described. When an "O" is read, the Write O gate is disabled and the Write X gate partially enabled; when an "X" is read, the Write X gate is disabled and the Write O gate partially enabled. Since a write-synchronizing pulse is applied both to the Write O gate and the Write X gate, the apparatus will cause the opposite of whatever is read to be written in a given cell, i. e., a "change-what-is-read" order is issued.

The utility of the read rapid-rise pulse-stretcher PR(3) can now be appreciated: it insures satisfactory time-safety margins. If it were not for pulse-srtetcher PR(3), the action of changing what was read would result in removing the order to perform the change and substituting the opposite order, namely to restore what was there. Thus, there is a danger that both writing circuits would be energized. The use of the short-term memory of the pulse-stretcher results in a persistence of the order to change even though the stimulus which provided the order is removed. Ambiguity is thereby avoided. The period of the pulse-stretcher must, of course, be less than the period between successive cell readings in order that each cell may be treated on its own merits without memory from the preceding cell.

The "mark" circuit, comprising mark track M(2) on drum DR(2), head HM(2), amplifier AMP1(2), mark monopulser MM(2), and cathode follower CF(2), provides a once-per-revolution pulse which is used to indicate the position on the drum of the cell containing the least significant digit of the then-stored number and which may also under external control, constitute the event to be counted.

As drum DR(2) rotates, the single magnetized incremental area on track M(2) will pass head HM(2) once per revolution of the drum producing an output pulse on conductor AI1. That output pulse is represented in Fig. 4H of the drawings. Each pulse on conductor AI1 is amplified and inverted by amplifier AMP1(2), which is shown in detail in Fig. 12, and the resulting negative-going pulse is applied via output conductor AO1 to mark monopulser MM(2) whereupon mark monopulser MM(2) will be triggered to its non-normal stable state wherein its right-hand section is conducting. As a result, the potential at its right-hand output (output 2) will sharply fall in value and this sharp reduction in potential will be applied through cathode follower CF(2) to conductor MM2. The potential on conductor MM2, as is represented in Fig. 4J, is applied through capacitor 310 to the No. 2 contact of switch SW1(3) for a purpose hereinafter to be described. The potential on conductor MM2 is also applied to the left-hand input of carry trigger CT(3).

Carry trigger CT(3) serves to register the binary digit which is to be "carried" to the next digit place. In the foregoing discussion of the theory involved, it was indicated that whatever is read in a particular digit place should be changed. The circuits hereinbefore described possess that propensity. However, a limiting condition was also established: the "change-what-is-read" order should be terminated when an "O" has been changed to an "X." The carry trigger CT(3) performs this terminating function. The first mark pulse on conductor MM2, after the system is energized, triggers carry trigger CT(3) to its non-normal stable state, i. e., to the right, and by virtue of the nature of the trigger circuit (as shown in detail in Fig. 11) carry trigger CT(3) will remain in this non-normal state until a resetting pulse is applied to its right-hand input via conductor WX1.

When carry trigger CT(3) is in its non-normal stable state, the rise in potential at its left-hand output (output 1) will be applied through cathode follower CF3(3) and via conductor CT1 to varistors VOC(3) and VXC(3) of the Write O gate and of the Write X gate, respectively, whereby both of these gates are partially enabled (so far as this control is concerned) so that a "change-what-is-read" order may be issued.

The first time an "X" is written, however, a change in the potential condition on conductor WX1 will occur due to the operation of the "X" normally quiescent blocking oscillator circuit comprising tube 904. This change in potential on conductor WX1 will reset carry trigger CT(3) to its normal state whereupon a reduced output potential will be applied through cathode follower CF(3) to varistors VOC(3) and VXC(3), thereby disabling both the Write O gate and the Write X gate and terminating the "change-what-is-read" order. The potential on conductor CT1 resulting from this cycle of operation of carry trigger CT(3) is depicted in Fig. 4L of the drawings.

At each operation of mark monopulser MM(2), which occurs each revolution of drum DR(2), a positive-going pulse will be applied to conductor MM1, as is represented in Fig. 4K of the drawings. Each such pulse on conductor MM1 is differentiated by means of the circuit comprising capacitor 205 and resistor 206 and applied to the input of supervisory monopulser SM(2). The negative-going spike resulting from the differentiation of the trailing edge of each pulse on conductor MM1 will trigger supervisory monopulser SM(2) to its non-stable state, and after a preselected interval, determined by the parameters of the monopulser circuit, monopulser SM(2) will restore to normal. Consequently, a positive-going square wave pulse will be applied via conductor SM1 and through capacitor 316 to the control grid of the right-hand section of gate tube G1(3). Each positive-going square wave pulse on conductor SM1 will also be differentiated by means of the circuit comprising capacitor 211 and resistor 212 and applied to the input of key trigger KT(2). The pulse applied to key trigger KT(2) is ineffective to shift the state of trigger KT (2) at this time since the positive spike will be blocked by varistor 1101 and since the negative spike is applied to a section which is already non-conducting.

The pulse applied to gate G1(3) will also be ineffective to produce any change in condition in that tube at this time. When, prior to the operation of key AK(2), key trigger KT(2) is in its normal condition, as shown, the left-hand section of gating device G1(3) has a high cathode potential since a high positive potential is applied to the control grid thereof by key trigger KT(2). Consequently, the cathode of the right-hand section of tube G1(3) is at a high potential, biasing the right-hand section of tube G1(3) far below cut-off—so far below cut-off, in fact, that the positive input pulse supplied to the control grid of the right-hand section of tube G1 (3) will be ineffective to render the right-hand section conductive. When, however, key AK(2) is momentarily operated, a sharply reduced potential is applied through network 215 and via conductor AK1 to the right-hand input of key trigger KT(2) thereby altering the state of key trigger KT(2) so that it becomes conducting on its left-hand section and non-conducting on its right-hand section, producing a sharp reduction of potential on conductor KT1.

Upon this sharp reduction of potential on conductor KT1, the cathode-follower action of the left-hand section of tube G1(3) results in a lower potential being applied to the cathode of the right-hand section of tube G1(3), thereby enabling the right-hand section of tube G1(3) to be rendered conductive by an incoming positive pulse. At the next "mark" pulse (i. e., the first mark pulse following the operation of key AK(2)), a positive-going pulse will appear on conductor SM1, as above described, which will be differentiated by capacitor 211 and resistor 212 and applied to key trigger KT(2). The pulse on conductor SM1 is also applied through capacitor 316 to the control grid of the right-hand section of tube G1(3). The positive-going spike resulting from the differentiation of the leading edge of the positive-going pulse on conductor SM1 will be ineffective to change the state of key trigger KT(2). However, since the right-hand section of tube G1(3) has been enabled in the manner hereinbefore described, the leading edge of the pulse applied through capacitor 316 will cause the right-hand section of tube G1(3) to become conductive, producing a sharp reduction in potential on output conductor GA. The negative-going spike resulting from the differentiation of the trailing edge of the pulse on conductor SM1 will trigger key trigger KT(2) back to its normal condition.

As a result of the termination of the pulse on conductor SM1, the right-hand section of tube G1(3) will again become non-conductive, and with key trigger KT(2) restored to normal, a high potential will again be applied to the control grid of the left-hand section of gate tube G1(3) whereby tube G1(3) will be restored to normal. The resulting negative-going pulse appearing on conductor GA is applied to the Nos. 2 and 3 contacts of switch SW2(3) and to the No. 4 contact of switch SW1(3).

Thus, summarizing the operations to this point, a negative-going pulse is applied to conductor MM2 each revolution of drum DR(2) and a negative-going pulse will be applied to conductor GA once during the course of a revolution of drum DR(2) immediately following a momentary operation of actuating key AK(2). The leading edge of the pulse on conductor GA substantially coincides in point of time with the trailing edge of the corresponding pulse on conductor MM2. These pulses are employed selectively to control the supervisory trigger SU(3) under the control of ganged switches SW1(3) and SW2(3) whereby these switches permit a choice of modes of computer operation.

When switches SW1(3) and SW2(3) are placed in their No. 1 positions, the computer is immobilized since the supervisory trigger SU(3) is held in its off condition, the only connection through the switches being the application of a suitable low positive potential from the voltage divider comprising resistors 311 and 312 through the No. 1 contact of switch SW1(3) to varistor 1102 (as shown in the detailed drawing of Fig. 11) so that a "kick" is applied to supervisory trigger SU(3) when the switch is turned to this position, thus setting the trigger to the desired "off" condition.

The placing of switches SW1(3) and SW2(3) in their No. 2 position permits the counting of the manual operations of actuating key AK(2) (or any external set of contacts which may be connected in parallel with those of key AK(2)). When key AK(2) is momentarily operated, the next pulse on conductor SM1 is gated through tube G1(3) and applied to conductor GA, as was hereinbefore described. The pulse on conductor GA is applied through the No. 2 contact of switch SW2(3) to trigger supervisory trigger SU(3) to the right, whereby an increased potential will be applied through the cathode follower CF4(3) and via conductor SU1 to varistors VOS(3) and VXS(3), thereby partially enabling both the Write O and the Write X gates. The differentiated trailing edge of the same pulse on conductor SM1 which was gated to conductor GA resets key trigger KT(2) to normal.

At the next pulse on conductor AI1 following that which produced the actions just described, a negative-going pulse will appear on conductor MM2 as was hereinbefore described and this negative-going pulse will be applied through capacitor 310 and through the No. 2 contact of switch SW1(3) to the reset terminal of supervisory trigger SU(3). The leading edge of this pulse will reset supervisory trigger SU(3) to its normal condition whereupon the output potential applied through cathode follower CF4(3) to conductor SU1 will fall to its original lower positive value, thereby disabling both the Write O and the Write X gates. The circuits then remain passive until key AK(2) is again momentarily operated whereupon another single count is made, i. e., whereupon "one" is again added to the recorded number in the manner hereinafter to be set forth.

If continuous counting at the drum-revolution rate is desired, switches SW1(3) and SW2(3) are moved to their No. 3 position. Conductor GA continues to be connected through switch SW2(3) to the input terminal of supervisory trigger SU(3). However, the mark reset lead MM2 is disconnected from the reset input terminal of supervisory trigger SU(3) so that a single momentary operation of actuating key AK(2) will cause a relatively high potential continuously to be applied to conductor SU1 whereby the Write O gate and the Write X gate are both partially enabled (so far as this control is concerned) to count each revolution of drum DR(2), i. e., to add "one" to the recorded number at each revolution of drum DR(2).

If switches SW1(3) and SW2(3) are set to their No. 4 positions the apparatus counts continuously, as in the No. 3 position, but the counting can be terminated at will by operating key AK(2). As will be seen this action is guarded so that any count, which may be in process when actuating key AK(2) is operated, is carried to completion before the arresting action takes place. Thus, with switches SW1 (3) and SW2(3) first being set in the No. 3 position, continuous counting is initiated in the manner hereinbefore described. If switches SW1(3) and SW2(3) are then shifted to their No. 4 positions, counting continues because supervisory trigger SU(3) remains triggered to the right. If, however, at any subsequent time key AK(2) is operated, key trigger KT(2) is shifted to its non-normal stable state, causing an enabling potential to be applied via conductor KT1 to gate G1(3). Consequently, the next pulse on conductor SM1 will be gated through tube G1(3) to conductor GA. The pulse on conductor GA will be applied through the No. 4 contact of switch SW1(3) to the reset terminal of supervisory trigger SU(3), resetting trigger SU(3) to normal, and thereby reducing the potential on conductor SU1 to a lower positive value whereby both the Write O gate and the Write X gate are disabled and whereby counting is terminated.

It will therefore be seen that at each read-synchronizing pulse on conductor RS1, potentials are applied to varistors VOR(3) and VXR(3) partially to enable the Write O gate if an "X" is read, partially to enable the Write X gate if an "O" is read, and to disable the other of the gates in either case. Additionally, unless an "X" was written on a preceding operation, both the Write X and the Write O gates are partially enabled (so far as this control is concerned) by the application of a suitable high potential to varistors VOC(3) and VXC(3) by the carry trigger CT(3) via cathode follower CF3(3) and conductor CT1. Consequently, if the Write X and Write O gates are also partially enabled (so far as this control is concerned) by the application of a suitably high positive potential to varistors VOS(3) and VXS(3) by the supervisory trigger SU(3) via cathode followed CF4(3) and conductor SU1, a write-synchronizing pulse on conductor WS1 will be gated through the Write O gate or the Write X gate to conductor TO or TX, respectively, to cause the read-write amplifier RW(2) to write an "O" or an "X," respectively.

In this manner, the number "one" is added to whatever number is then stored in channel D(2) of drum DR(2), either for each operation of key AK(2) (or external, parallel, contacts) or for each revolution of drum DR(2) depending upon the setting of switches SW1(3) and SW2(3), which may, of course, be relays or other remote-control switches. It may be noted that a completely external source of pulses to be counted may be connected to supervisory trigger SU(3), if desired, in an obvious manner, provided that the period between pairs of such pulses is not less than the period between "mark" pulses on the drum, i. e., one drum-revolution time in the example explained.

Referring now to Figs. 6 to 8, showing a second embodiment of the invention, in order to perform the operations either of writing, reading, adding or subtracting there must be a means for indicating a starting point on the periphery of the drum and there must also be a means for defining each of the successive cells around the periphery of the drum DR(8). The former of these means comprises the mark track M(8) on drum DR(8) and the associated head HM(8) and amplifier AMP1(8), and the latter of these means comprises the timing track T(8) and the associated head HT(8) and amplifier AMP2(8), or equivalent means.

As drum DR(8) rotates, the single magnetized incremental area on channel M(8) will pass head HM(8) once per revolution of the drum, producing an output pulse on conductor AO1 in the manner hereinbefore described. Each of these output pulses triggers mark monopulser MM(7) through one cycle of operation whereby a positive-going pulse is transmitted over conductor MM1. These pulses will be ineffective to produce a useful result, however, until such time as actuating key AK(7) is operated.

When key trigger KT(7) is in its normal condition, as shown, the left-hand section of gating device G1(7) is conducting strongly since a high positive potential is applied to its grid by key trigger KT(7) and via conductor KT1. As a result of this high degree of conduction, there is a large potential drop across resistor 715, which is common to the cathodes of both sections of tube G1(7). Consequently, the cathode of the right-hand section of tube G1(7) is at a high potential, biasing the right-hand section of tube G1(7) far below cut-off—so far below cut-off, in fact, that an input pulse of controlled amplitude applied to the control grid of the right-hand section of tube G1(7) will be ineffective to render the right-hand section conductive.

Figure 15:
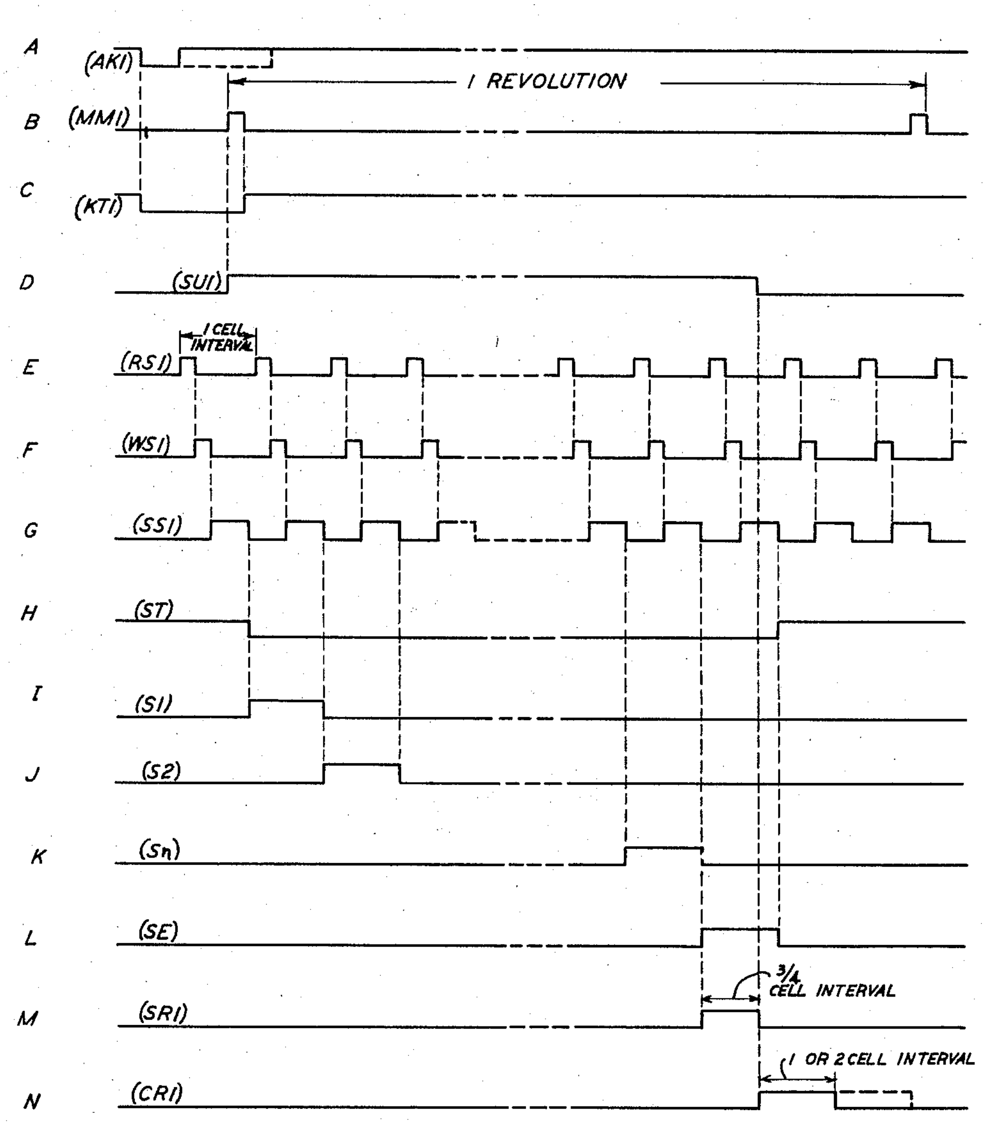
Figs. 15A to 15N are a series of curves representing voltage conditions at certain points in the circuits shown in Figs. 6 to 8.

When key AK(7) is momentarily operated, a sharply reduced potential is applied, via conductor AK1, as shown in Fig. 15A, to the input of key trigger KT(7) thereby altering the state of key trigger KT(7) so that it becomes conducting on its left-hand section and non-conducting on its right-hand section, producing a sharp reduction of potential on conductor KT1.

Upon this sharp reduction in potential on conductor KT1 as a result of the operation of key trigger KT(7), conduction in the left-hand section of tube G1(7) is reduced and a lower potential is applied to the cathode of the right-hand section of tube G1(7) thereby enabling the right-hand section of tube G1(7), though still cut off at this time, to be rendered conductive by an incoming pulse. At the next mark pulse (i. e. the first mark pulse following the operation of key AK(7)) received from amplifier AMP1(8) via conductor AO1, mark monopulser MM(7), which is normally conducting on its left-hand section, will be triggered to the right producing a sharp rise in potential on output conductor MM1. After an interval determined by the parameters of the monopulser circuit, mark monopulser MM(7) will restore to normal, reducing the output potential on conductor MM1 to its original value. The output on conductor MM1 is represented in Fig. 15B. This positive-going square wave pulse on conductor MM1 is applied both to key trigger KT(7) and through capacitor 701 to the control grid of the right-hand section of tube G1(7). The leading edge of this positive-going pulse will be ineffective to affect key trigger KT(7). However, since the right-hand section of tube G1(7) has been enabled in the manner hereinbefore described, the leading edge of this pulse will cause the right-hand section of tube G1(7) to become conductive, producing a sharp reduction in potential on output conductor GA. The trailing edge of the pulse on conductor MM1 will trigger KT(7) back to its normal condition.

As a result of the termination of the pulse on conductor MM1, the right-hand section of tube G1(7) will again become non-conductive, and with key trigger KT(7) restored to normal, a high potential will again be applied to the control grid of the left-hand section of gate tube G1(7) whereby gate tube G1(7) will be restored to normal. The pulse which appears on conductor KT1, as a result of the previously described cycle of operation of key trigger KT(7), is represented in Fig. 15C.

The leading edge of the negative-going pulse on conductor GA will cause the supervisory trigger SU(7) to become conducting on its right-hand section, producing a sharp rise in potential on output conductor SU1. Supervisory trigger SU(7) will remain in this condition until a resetting pulse is applied to the right-hand section of supervisory trigger SU(7) in the manner hereinafter to be described. The potential on conductor SU1, as a result of this cycle of operation of supervisory trigger SU(7), is represented in Fig. 15D.

The rise in potential on conductor SU1 is applied to varistor V1(6), to varistor VXS(8) of the Write X gate (Fig. 8) and to varistor VOS(8) of the Write O gate (Fig. 8), for purposes hereinafter to be described.

As above described, an output pulse is applied to conductor AO2 by amplifier AMP2(8) as each cell passes head HT(8). These pulses on conductor AO2 are applied to the input of the read-synchronizing monopulser RS(7). At each pulse, monopulser RS(7) will be triggered so as to become conducting on its right-hand section and after a preselected delay will restore to its normal state. This monopulser is provided with a cathode follower output as represented in Fig. 13. The read-synchronizing monopulser RS(7) will therefore, in response to each pulse on conductor AO2, produce a positive-going square wave pulse of predetermined duration. These output pulses on conductor RS1, as represented in Fig. 15E, are applied to the reading amplifiers R1(8) and R2(8) of the read-write amplifiers RW1(8) and RW2(8), respectively, and also to varistor VRS(8) for purposes hereinafter to be described.

The series of pulses on conductor RS1 are also applied to the input of the write-synchronizing monopulser WS(7) which is also provided with a cathode follower output. Since monopulser WS(7), as shown in Fig. 13, is responsive only to negative-going input signals, it will be triggered by the trailing edge of each of the input pulses so that the output on conductor WS1 will be a series of positive-going square wave pulses the leading edge of each of which substantially coincides, in point of time, with the trailing edge of the corresponding pulse on conductor RS1. These output pulses on conductor WS1, as depicted in Fig. 15F, are applied to the writing gate G2(7) and to gates G3(8) and G4(8), for purposes hereinafter to be described. Additionally, the output pulses on conductor WS1 are applied to the step synchronizing monopulser SS(7). The parameters of the circuit of this monopulser, as shown on Fig. 13 including the cathode follower output, are so selected that after triggering the circuit will not restore to normal for a period of time equal to about one-half of a cell interval, i. e., about one-half of the time space between corresponding portions of adjacent pulses on conductor AO2, RS1 (Fig. 15E) or WS1 (Fig. 15F). This pulse train on output conductor SS1 is represented in Fig. 15G.

The pulses on conductor SS1 are applied to varistor V2(6) of the stepping gate SG(6). Stepping gate SG(6) comprises a pair of varistors V1(6) and V2(6), a conductor SG1, resistor 601 and potential source 602 arranged in a conventional "and" circuit, i. e., a circuit in which an output signal is obtained only if input signals are applied to all of the varistors comprising the gate concurrently. Thus, for a signal to appear on output conductor SG1, positive pulses must be concurrently applied to varistors V1(6) and V2(6) via conductors SU1 and SS1 respectively. It will be recalled that conductor SU1 is at a suitable positive potential (Fig. 15D) and, therefore, a positive pulse will appear on conductor SG1 each time that a positive pulse is received via conductor SS1 (Fig. 15G), i. e., until such time as the supervisory trigger SU(7) is reset, the pulses on conductor SS1 (Fig. 15G) will be repeated on conductor SG1.

The positive-going square wave pulses on conductor SG1 are applied through individual networks to the control grid of the right-hand section of each of the stepping-chain tubes ST(6) to SE(6). Thus, for example, as the result of the appearance of a pulse on conductor SG1, a pulse is applied to the control grid of the right-hand section of start tube ST(6), the controlling network including capacitors 603 and 604 and resistors 605 and 606. Each of the dual tube circuits ST(6) to SE(6) constitutes a trigger circuit of conventional nature, the cathodes of the several tubes being grounded through resistance-capacitance networks 607 and 608, which are common to all of the stepping-chain trigger circuits, and in which the resistive element of network 608 is greater than the resistive element of network 607, the anodes being connected to a source of positive potential through individual load resistors such as resistors 609 and 610, the control grids being provided with individual biasing resistors such as 611 and 606 and the tubes of any one trigger circuit being cross-coupled by means of resistance-capacitance networks. Trigger circuits S1(6) to SE(6) normally rest with the left-hand section conducting and the right-hand section non-conducting. However, by virtue of the bias applied to the right-hand section of tube ST(6) by the resetting device CRS(6), the operation of which will be explained hereinafter, the right-hand section of tube ST(6) is normally conducting and the left-hand section normally non-conducting.

At the trailing edge of the first pulse to appear on conductor SG1, the control grid of the right-hand section of tube ST(6) will be driven below cut-off which will result in a change of the state of tube ST(6) whereby the left-hand section thereof will become conducting and the right-hand section non-conducting. Due to the potential drop across load resistor 609, a negative-going pulse (Fig. 15H) will be transmitted through capacitor 622 and the cross-coupling network 623 to the control grid of the left-hand section of tube S1(6) thereby rendering the left-hand section of trigger S1(6) non-conducting and the right-hand section conducting.

At the next pulse on conductor SG1, which is applied through individual networks to the control grid of the right-hand section of all of the stepping-chain tubes ST(6) to SE(6), the right-hand section of tube S1(6) will be driven below cut-off, restoring tube S1(6) to its original condition. The right-hand grids of all other tubes are already biased below cut-off at this time, and so will be unaffected by the pulse. This cycle of operation of tube S1(6) is represented in Fig. 15I which is a representation of the voltage at the anode of the left-hand section of tube S1(6) with respect to time. When that anode again drops to its original potential, a negative pulse is applied through capacitor 624 to the control grid of the left-hand section of tube S2(6) thereby cutting off this section and causing its anode to rise in potential. This rise of potential is communicated to the grid of the right-hand section of the tube by the cross-coupling networks and over-rides the negative pulse coming from lead SG1, with the result that the state of the trigger comprising tube S2(6) is changed. At the next pulse on conductor SG1, tube S2(6) is restored to normal (Fig. 15J) and the next succeeding tube (not shown) in the stepping chain is triggered to its non-normal stable state. In this fashion, the succeeding tubes of the stepping chain are successively triggered to their non-normal stable states and reverted to their normal stable states, until the last of these tubes, SE(6), is shifted to its non-normal stable state in response to the n+1th pulse on conductor SG1. The potential at the anode of the left-hand section of tube S*n*(6) is shown in Fig. 15K and the potential at the anode of the left-hand section of tube SE(6) is shown in Fig. 15L.

When, in response to the restoration of tube S*n*(6) to its normal condition, the right-hand section of tube SE(6) is rendered conductive, i. e., at the n+1th pulse, the potential at the anode of the right-hand section of tube SE(6), and consequently the potential on conductor SE1, will sharply drop in value. This negative-going pulse on conductor SE1 is applied to the supervisory reset monopulser SR(6) and triggers monopulser SR(6) so that it is conducting on its right-hand section. The parameters of monopulser SR(6) are selected so that monopulser SR(6) will not restore to normal for a period of time substantially equal to three-fourths of a cell interval. Consequently, a positive-going square wave pulse approximately three-fourths of a cell interval in duration will be applied to conductor SR1, as is represented in Fig. 15M. The pulse on conductor SR1 is applied to the chain reset monopulser CR(6) and the trailing edge of that pulse will trigger monopulser CR(6) through one cycle of operation. The parameters of monopulser CR(6) are so selected that restoration will not occur for a period of time equal to approximately one or two-cell intervals. Consequently, a positive-going square wave pulse one or two-cell intervals in duration will be applied to conductor CR1, as is shown in Fig. 15N. The pulse on conductor CR1 is applied through cathode follower CRS(6) and the network comprising resistor 606 and capacitor 625, and thence to the control grid of the right-hand section of tube ST(6). The relatively long duration of this pulse, which changes the bias on the grid of the right-hand section of tube ST(6), insures that the right-hand side will become conductive and, in so doing that the left-hand side will become non-conducting. The change in bias supplied by tube CRS(6) is substantial however, and the grid of the right-hand section of ST(6) will be carried considerably more positive than its normal value. This grid excursion will cause considerably more current than normal to flow through the resistive element of network 608 and consequently will carry the cathodes of all right-hand tube sections to a higher-than-normal positive voltage. The right-hand sections of all tubes except tubes ST(6) and SE(6) are cut off at this time and so will not be affected. The right-hand section of tube SE(6), however, will be cut off by this action and this, in turn, via the cross-coupling network, will render the left-hand section of tube SE(6) conducting. When the pulse applied to resistor 606 subsides, which will happen slowly, under the influence of the network comprising resistor 606 and capacitor 625, the entire counting chain will have been restored to the initially obtaining conditions. The resetting of the stepping chain by the restoration of tubes ST(6) and SE(6) to normal is represented in Figs. 15H and 15L.

The pulse on conductor SR1 (Fig. 15M) is also applied to the reset input of supervisory trigger SU(7), and the trailing edge of that pulse then restores trigger SU(7) to its initial condition in which the left-hand section is conducting. As a result, the potential on output conductor SU1 drops back to its lower positive value (Fig. 15D) which serves to block stepping gate SG(6) thereby terminating the application of pulses to conductor SG1. Consequently, the stepping chain of Fig. 6 thereafter remains in its normal condition.

The three-fourths of a cell interval period of supervisory reset monopulser SR(6) delays the termination of the supervisory pulse on conductor SU1 (Fig. 15D) until the operations hereinafter to be described have been completed. The one-to-two-cell-interval period of chain reset monopulser CR(6), in addition to the previously described function, serves to insure that all input pulses on conductor SG1 will have terminated prior to the restoration of the stepping chain to normal.

The results accruing from the operation of the stepping chain depend, in part, upon the setting of switch SW(7). The first operation normally to be performed is that of recording in channel A(8) of drum DR(8) a first number which may be either an augend or a minuend depending upon ensuing operations. Consequently, let it be assumed that switch SW(7), including its several banks SW1(7) to SW7(7), is set in position No. 1.

With bank SW7(7) of switch SW(7) in either of the writing positions, i. e., in either position No. 1 or No. 2, a steady source of low positive potential from voltage divider VD1(7) is applied through bank SW7(7) and conductor 702 to varistors V1B(6), V2B(6) . . . VnB(6) and VEB(6) of the display gates thereby disabling or holding off each of these "and" display gates during the writing operations. The subsequent operation of the display gates and of the display register will be described in detail hereinafter.

The stepping chain controls the recording of the first number in channel A(8) of drum DR(8). The number which is to be so recorded is entered in binary form on the key-set comprising keys K1(6) to K*n*(6), with the least significant digit being recorded on key K1(6) and with the succeeding digits being entered in ascending order in the successive keys K2(6) to K*n*(6). Thus, assuming the first number to be binarily designated as "XO . . . X," then key K1(6) should be depressed to the "X" position, key K2(6) should be left in the "O" position, the succeeding keys (not shown) should be set in their appropriate positions, and the final key K*n*(6) should be depressed to the "X" position. When the setting of keys K1(6) to K*n*(6) has been completed, the writing action is initiated by momentary operation of the actuating key AK(7). Each of the keys K1(6) to K*n*(6) selectively applies the output from the right-hand section of its associated stepping-chain trigger circuit to the associated "O" or "X" varistors VO1(6) to VO*n*(6) or VX1(6) to VX*n*(6). Each of these groups of varistors is suitably arranged and biased to act as a negative-going "or" circuit or gate, the upper group of varistors VO1(6) to VO*n*(6), and including varistor VOE(6), being biased by the voltage divider comprising positive battery, resistor 615, resistor 703, resistor 704, and negative battery, and the lower group of varistors VX1(6) to VX*n*(6) being biased by the voltage divider comprising positive battery, resistors 616, 705 and 706 and negative battery. It will be noted that the above-mentioned voltage dividers also provide a suitable bias for tubes WO(7) and WX(7), respectively.

As before noted, each of the trigger circuits S1(6) to S*n*(6) is normally conducting on its left-hand section, so that a potential substantially equal to that of battery 620 is selectively applied to the varistors VO1(6) to VX*n*(6) from the anodes of the right-hand sections of those tubes in accordance with the settings of the keys K1(6) to K*n*(6). As tube S1(6) is triggered to become conductive on its right-hand section, the potential applied through depressed key K1(6) to varistor VX1(6) is sharply reduced in value so that a negative-going pulse is applied through resistor 705 to the grid of tube WX(7), which cuts off its plate current and would tend to cause a corresponding sharp rise in the potential at the anode of tube WX(7) except for the presence of varistor VX(7). When tube S1(6) is triggered back to its normal condition, the potential at the anode of its right-hand section will revert to its higher value so that varistor VX1(6) no longer transmits the current required for the reduced potential at the grid of tube WX(7). When the right-hand section of tube S2(6) becomes conductive the resulting sharp reduction of potential at the anode of that section is applied through the upper contact of unoperated key K2(6) and through varistor VO2(6) and resistor 703 to the grid of tube WO(7) which cuts off its plate current and would tend to produce a sharp rise in the potential at the anode of tube WO(7) except for the presence of varistor VO(7). After tube S2(6) is triggered back to normal and as each of the succeeding tubes in the stepping chain is triggered, a series of negative-going pulses are applied to the input of tube WO(7) or WX(7) in accordance with the settings of the keys individual to the succeeding stepping-chain tubes. These negative-going signals, appearing at the grid of tube WO(7) or WX(7), are of similar shape and duration to, but inverted forms of, the curves S2 to SE in Figs. 15J to 15L.

The anodes of tubes WO(7) and WX(7), however, are connected to one terminal of varistors VO(7) and VX(7), respectively, the other terminals of which are connected to the "write-synchronizing" pulse lead WS1. Varistors VO(7) and VX(7) constitute a gate G2(7) and the parameters of this gate are such that varistors VO(7) and VX(7) present a low impedance when the potential at their lower terminals is at a relatively low positive value, and present a high impedance when the potential at their lower terminals is at a relatively high positive value. Therefore, the anodes of tubes WO(7) and WX(7) can rise in potential, thereby transmitting a signal to the wipers of switch bank SW6(7) or SW5(7), respectively, only when a write-synchronizing pulse is applied to conductors WS1.

As may be seen by comparing curve 15F, representing the "write-synchronizing" pulses, with curves 15I to 15L, during a relatively short period during every cell interval, gate G2(7) will permit a rise in potential on the conductors connected to the wipers of switch bank SW6(7) or SW5(7), respectively. Any such resultant rise in potential will be communicated through the No. 1 contact of switch bank SW6(7) or SW5(7), through the No. 1 contact of switch bank SW1(7) or SW2(7), and via conductor TO1 or TX1 to writing amplifier W1(8) of the read-write amplifier RW1(8) (see Fig. 9) whereby an "O" or an "X" will be written in the cell then under writing head HA(8). Thus, under the conjoint control of the stepping chain (Fig. 6) and the write-synchronizing monopulser WS(7), the number represented by the selective actuation of keys K1(6) to K$n$(6) will be serially registered in track A(8) of drum DR(8), one binary unit being registered in each of the succeeding cells of track A(8) from cell "1" to cell "$n$." Since the right-hand output of stage SE(6) is connected to tube WO(7) through varistor VOE(6), the next or $n+1$th cell will register an "O," irrespective of the key settings.

The operation normally next performed is the writing in channel B(8) of drum DR(8) of another number, which may be utilized as an addend or a subtrahend in subsequent operations. The keys K1(6) to K$n$(6) are set in accordance with the binary representation of this number, switch SW(7) is set to its No. 2 position, "Write B," and the actuating key AK(7) is momentarily operated. The system functions thereafter in a manner similar to that previously described except that the write-synchronizing pulses appearing at the anodes of tubes WO(7) and WX(7) are now applied through the No. 2 contacts of switch banks SW6(7) and SW5(7), respectively, and via conductors TO2 and TX2, respectively, to writing amplifier W2(8) of the read-write amplifier RW2(8) whereby the second number is recorded in track B(8) on drum DR(8).

The numbers entered in channel A(8) or B(8) may now be verified by setting switch SW(7) to its No. 3 position, and momentarily operating the actuating key AK(7), whereupon the number recorded in track A(8) will be displayed in binary form on the display register (Fig. 6), or by setting switch SW(7) in its No. 4 position, and operating key AK(7) whereupon the number recorded in track B(8) will be displayed in binary form on the display register (Fig 6.). Operation of the Extinguish Display key ED(6) will restore the display register to normal so that another, perhaps different, display may be registered. The functioning of the circuits in such an operation will be described hereinafter.

Before proceeding with a detailed description of the functioning of the apparatus during the mathematical operations of addition or subtraction, it may be well to consider the theoretical considerations involved in adding two binary numbers serially recorded on parallel tracks on a magnetic drum, and the general nature of the apparatus required.

In any process in which two numbers are added, on drums or otherwise, the value of three quantities must be considered in dealing with each digit place: the values of the two digits which are to be added and the value of the "carry" resulting from adding operations on earlier pairs of digits, if any. Next to be considered after the adding operation which produces the sum for a given digit place is the "carry" which may have resulted from this operation and which must be taken into account in the next operation.

In the binary scale, each of these three quantities can have only two possible values, herein labeled "X" and "O," corresponding to the binary values "one" and "zero," so that the possible number of different initial situations, at any arbitrary digit place, is $2^3$ or 8. These eight possibilities may be tabulated as follows, where A and B represent the digit values (in the same digit place) of the two numbers to be added, and C represents the value of the "carry" resulting from previous operations, if any:

TABLE I

*Addition*

| Possibility | 1 | 2 | 3 | 4 | 5 | 6 | 7 | 8 |
|---|---|---|---|---|---|---|---|---|
| I. Track A | O | O | O | O | X | X | X | X |
| II. Track B | O | O | X | X | O | O | X | X |
| III. C (Carry) | O | X | O | X | O | X | O | X |
| IV. Value required in track A to represent sum | O | X | X | O | X | O | O | X |
| V. "Carry" value required to be passed on | O | O | O | X | O | X | X | X |
| VI. "Change-what-is-read" order to track A? | No | Yes | Yes | No | No | Yes | Yes | No |
| VII. Order to carry trigger CT | ------ | O | ------ | ------ | ------ | ------ | X | ------ |

With any of the possible assumed values in track A (line I), in track B (line II) and in the carry register (line III), the values required to represent in track A the sum of these values (line IV) and the "carry" required for the next digit place (line V), are determined by well-known principles of binary addition. Some further discussion may be required, however, in connection with the last two lines (lines VI and VII) of Table I.

A type of apparatus will be described in detail hereinafter which performs the same functions as the corresponding apparatus of Figs. 2 and 3, viz., the functions of reading the contents of each cell in the track as it passes by, of partially enabling the writing gate for the opposite symbol, and of completely disabling the writing gate for the symbol read. Thus, reading an "X" in a cell would partially enable the Write O gate but completely disable the Write X gate. If an "O" is read, the Write X gate is partially enabled and the Write O gate is disabled. An input lead is provided which goes to both gates, so that a pulse at the input would partially enable both the Write X and the Write O gates. This combination of arrangements results in the property that an input pulse will cause the writing of the opposite of whatever is found in the given cell; in the absence of an input pulse, no writing action is taken. This mode of operation is herein termed a "change-what-is-read" action.

Assuming the use of a "change-what-is-read" type of action, Table I may be inspected to compare what was originally found in track A with what is required to be there when the addition of the corresponding B digit and "carry" digit, if any, has been performed. The result of such inspection is indicated in line VI of Table I: in four of the eight possible situations, namely, numbers 2, 3, 6 and 7, a "change-what-is-read" order will provide the proper action. In the remaining four cases no writing action is required.

The manipulative operations with respect to the digit-place under consideration are not complete, however, until it is determined what "carry" value is required to be passed on to the next succeeding digit-place, and means must be provided not only for ascertaining this value but also for preserving it until time for action in the next succeeding place. Short-term memory of this sort may be provided, for example, by a bistable trigger circuit. Returning to Table I for a comparison of the carry value in line III with the carry value required to be passed on for the next operation, it is found that the value need be changed in only two out of the eight possible situations; in situation 2 an existing "X" must be changed to an "O" and in situation 7 an existing "O" must be changed to an "X." This means that a pulse must be furnished to the O input of the "carry" register (carry trigger CT(8)) in the one case, and to the X input in the other case.

Difficulty with time margins may be encountered unless some special precautions are taken. The initial value of the "carry" must be preserved during the actual adding operation even though one of the results of this operation may be an order to change that value. To avoid any possibility of malfunctioning, a pulse stretcher (carry pulse stretcher PC(8)) similar to that described and used to avoid ambiguity in the magnetic reading and writing operations may also be employed for the "carry" information. With this scheme, hereinafter to be described in detail, the "O" or "X" state of the carry trigger CT(8) is sampled by the read-synchronizing pulse, just as, as will be seen, the reading amplifiers are sampled, and the carry pulse stretcher PC(8) is tripped if an "X" is read. The write-synchronizing pulse can then be gated, by the appropriate orders, and used to change the condition of the "carry" trigger, just as, under diffeernt orders, it changes the state of the magnetic material in tracks A(8) and B(8) through a writing operation.

The rules for producing a "change-what-is-read" pulse and for gating the write-synchronizing pulses to the "O" or "X" input of the carry trigger CT(8) may now be developed. Inspection of lines II, III and VI of Table I shows that a "change-what-is-read" pulse is required whenever an "O" is read in track B(8) and an "X" is carried and also whenever an "X" is read in track B(8) and an "O" is carried. This may be represented as: $(BO+CX)$ or $(BX+CO)$. No pulse is required for any other combination.

With respect to the "carry," it may be seen from an inspection of lines I, II, III, V and VII of Table I that there must be a change from an "X" to an "O" (or retention of an "O" already present) whenever an "O" is found in both tracks A(8) and B(8) and that there must be a change from an "O" to an "X" (or retention of an "X" already present) whenever an "X" is found in both tracks A(8) and B(8). No action is required for any other combination. The rules affecting the carry trigger CT(8) are then:

$(AX+BX)$ gates the "X" input of the "carry" trigger, $(AO+BO)$ gates the "O" input of the "carry" trigger.

Considering again the detailed operations of the system shown in Figs. 6 to 8, it will be recalled that at this point two numbers are registered in drum DR(8), with the least significant digit of each of those numbers being presented first, and with like digit places of the two numbers occupying the same "time slot" so that the like digit places of the two numbers may be read simultaneously on different output conductors.

In order to add the number recorded in track B(8) to the number recorded in track A(8) and to record the sum in track A(8), for example, switch SW(7) should be set at its No. 5 "Add" position and the actuating key AK(7) depressed, thereby operating key trigger KT(7) and enabling gate G1(7). In the manner previously described, at the next mark pulse on conductor AO1, the mark monopulser MM(7) triggers gate G1(7) thereby actuating supervisory trigger SU(7), causing a rise in potential on conductor SU1 which is applied both to the stepping gate SG(6) and to the Write X gate (Fig. 8) and the Write O gate (Fig. 8). Since the read-synchronizing monopulser RS(7), the write-synchronizing monopulser WS(7) and the step-synchronizing monopulser SS(7) continue to operate as long as drum DR(8) rotates, upon the operation of supervisory trigger SU(7) the stepping chain of Fig. 6 again runs through its cycle, causing the supervisory trigger SU(7) to be reset. As a result, the voltage on conductor SU1 again restores to its lower positive value, the positive square wave on conductor SU1 existing for $n+2$ or $n+3$ cell intervals (Fig. 15D) as previously dsecribed.

The "first" cell in each of the tracks A(8) and B(8), containing the least significant digits of the two numbers which are to be added, is partially under the head HA(8) or HB(8) when the first read-synchronizing pulse occurs (Fig. 15E) after a mark pulse (Fig. 15B), and is centered under the head HA(8) or HB(8) at the next write-synchronizing pulse (Fig. 15F). Therefore, the first cell in each of the tracks A(8) and B(8) will be read at the occurrence of that read-synchronizing pulse. Since writing can occur only after the supervisory trigger SU(7) has operated, it will be assumed that trigger SU(7) has operated and that conductor SU1 is, therefore, at its higher potential, as above described. This high potential on conductor SU1 is applied to varistors VXS(8) and VOS(8), thereby partially enabling the Write X and Write O "and" gates of Fig. 8.

Since it is assumed that the least significant digit in track B(8) is being added to the corresponding digit in track A(8), there can be no "carry" from any previous operation. Consequently, the situation in which there is no "carry," i. e., in which there is "O" carry, will first be considered.

If there is no "carry" from a preceding operation, the carry pulse-stretcher PC(8) will remain in the disclosed condition wherein the left-hand section is conducting. Consequently, output conductor PCX, connected to varistor VCX(8), will be at a relatively low potential, blocking the "and" gate comprising varistors VCX(8) and VBO2(8); and output conductor PCO, connected to varistor VCO(8), will be at a relatively high potential, partially enabling the "and" gate comprising varistors VCO(8) and VBX2(8).

At the application of the positive read-synchronizing pulse on conductor RS1 to the reading amplifiers R1(8) and R2(8), the contents of the cells in tracks A(8) and B(8) containing the least significant digits will be read. As before described in relation to the detailed showing of Fig. 9, if an "X" is read in track A(8) or B(8), a negative-going, essentially square wave pulse will be applied to conductor RO1 or RO2, respectively, triggering the A pulse-stretcher PA(8) or the B pulse-stretcher PB(8), respectively. These pulse-stretchers, as disclosed in detail in Fig. 13, restore after a preselectable interval. A positive-going square wave pulse is transmitted over output conductor PAX or PBX, respectively, and a negative-going square wave pulse is transmitted over output conductor PAO or PBO, respectively, when these pulse-stretchers are triggered. On the other hand, if an "O" is read in track A(8) or B(8), no output pulse appears on conductor RO1 or RO2, the pulse-stretchers PA(8) and PB(8) are not triggered, and the potential on output conductor PAX or PBX remains at a relatively low positive value while the potential on output conductor PAO or PBO remains at a relatively high positive value.

Output conductors PBX and PBO from the B pulse-stretcher PB(8) are connected to varistors VBX2(8) and VBO2(8), respectively. Consequently, if an "O" is read on track B(8) a relatively low positive potential continues to be applied via conductor PBX to varistor VBX2(8), disabling or blocking the gate comprising varistors VBX2(8) and VCO(8), and a relatively high positive potential continues to be applied to varistor VBO2(8), partially enabling the gate comprising varistors VBO2(8) and VCX(8). However, the latter gate is disabled by virtue of the relatively low positive potential which is applied to varistor VCX(8) by the carry pulse-stretcher PC(8), previously considered, and consequently both of the gates associated with the grids of tube T4(8) are blocked. As a result, the cathodes of the two sections of tube T4(8) are at a relatively low positive potential, and this potential, as applied to varistors VXC(8) and VOC(8), effectively disables or blocks both the Write X gate and the Write O gate. From the previous discussion of the theory involved, this is as it should be, for no "change-what-is-read" order should be transmitted when there is no "carry" and an "O" is read in track B(8) (see Table I).

If on the other hand, an "X" is read in track B(8), conductor PBO assumes a relatively low positive potential, blocking or disabling the gate comprising varistors VBO2(8) and VCX(8), and conductor PBX assumes a relatively high positive potential, completing the enablement of the gate comprising varistors VBX2(8) and VCO(8). Consequently, a positive pulse will be applied to the control grid of the right-hand section of tube T4(8), the cathode of both sections will rise in potential due to the drop across load resistor 805, and a relatively high positive potential will be applied to varistors VXC(8) and VOC(8), partially enabling both the Write X and the Write O gates so far as this control is concerned. From the previously presented theory, this also is as it should be, since if there is no "carry" and if an "X" is read in track B(8), a "change-what-is-read" order should be issued (see Table I).

Considering now the reading of track A(8) of drum DR(8), conductor PAX is connected to varistor VOR(8), which is an element of the Write O gate, and conductor PAO is connected to varistor VXR(8), which is an element of the Write X gate. Consequently, if an "O" is read in track A(8), whereupon a relatively low positive potential continues to be applied via conductor PAX to varistor VOR(8), the Write O gate is effectively blocked or disabled. However, the Write X gate is partially enabled under these circumstances since a relatively high positive potential is applied via conductor PAO to varistor VXR(8). If, on the other hand, an "X" is read in track A(8), pulse-stretcher PA(8) is triggered so that conductor PAX assumes a relatively high positive potential and conductor PAO assumes a relatively low positive potential. As a result, the Write O gate will be partially enabled and the Write X gate will be effectively disabled.

Thus, summarizing, both the Write X and the Write O gates are partially enabled by the supervisory pulse on conductor SU1. Since there is no "carry," both gates are disabled if an "O" is read in track B(8), and both gates are partially enabled if an "X" is read in track B(8). If an "O" is read in track A(8), the Write X gate is partially enabled and the Write O gate is disabled; if an "X" is read in track A(8), the Write O gate is partially enabled and the Write X gate is disabled. Therefore (assuming "O" carry), when the next write-synchronizing pulse is received via conductor WS1 and applied to varistors VXW(8) and VOW(8), a positive pulse will be transmitted by the Write X gate over conductor WXO if an "X" is read in track B(8) and an "O" is read in track A(8), i. e., $AO+BX+CO$; and a positive pulse will be transmitted by the Write O gate over conductor WOO if an "X" is read in track B(8) and an "X" is read in track A(8), i. e., $AX+BX+CO$. This pulse on conductor WXO or WOO constitutes the "change-what-is-read" order. This result accords with the earlier presented theory since, as was then stated, a "change-what-is-read" order should be transmitted whenever the combination $BX+CO$ exists.

The pulse on conductor WXO or WOO is applied through the No. 5 contact of switch bank SW2(7) or SW1(7), respectively, to conductor TX1 or TO1, which is connected to the Write X or Write O input, respectively, of writing amplifier W1(8). As was previously described with reference to Fig. 9, the application of a positive pulse to conductor TO1 will cause an "O" to be written in track A(8) and the application of a positive pulse on conductor TX1 will cause an "X" to be written in track A(8). In this manner, the "change-what-is read" order is executed.

In the above-described situation, it was assumed that there was no "carry" from a preceding operation, i. e., that carry trigger CT(8) was conducting on its right-hand section so that its output potential was at a relatively low value, effectively disabling or blocking the gate comprising varistors VCT(8) and VRS(8). Let it now be assumed that in the immediately preceding operation a combination of values was read which necessitated a "carry" to the next (now the instant) digit place whereby carry trigger CT(8) is now set in its "X" condition, with the left-hand section being conducting and the right-hand section non-conducting. (The manner in which carry trigger CT(8) is set will be described hereinafter.)

With the left-hand section of carry trigger CT(8) conducting, the output potential thereof (output No. 2) will be at a relatively high value, and this potential, applied to varistor VCT(8), will partially enable the "and" gate comprising varistors VCT(8) and VRS(8). When, thereafter, that positive-going read-synchronizing pulse on conductor RS1 (Fig. 15E) which initiates the operation of reading amplifiers R1(8) and R2(8) is applied to varistor VRS(8), it will pass through the gate comprising varistors VRS(8) and VCT(8) since that gate was already partially enabled. This pulse will be applied to the grid of tube T3(8) which will, in turn, apply a negative-going pulse to the input of carry pulse-stretcher PC(8) (see Fig. 13). Pulse-stretcher PC(8), normally conducting on its left-hand section, will be triggered by this pulse, causing it to become conducting on its right-hand section for a preselected period, after which it will restore. For a limited period after the occurrence of the pulse on conductor RS1, therefore, the carry pulse-stretcher PC(8) will duplicate and hold the condition defined by the carry trigger CT(8) even though the carry trigger itself may thereafter change.

While pulse-stretcher PC(8) is triggered to its non-stable state, output conductor PCO will be at a relatively low positive potential and output conductor PCX will be at a relatively high positive potential so that the gate comprising varistors VCX(8) and VBO2(8) will be partially enabled, and the gate comprising varistors VCO(8) and VBX2(8) will be blocked or disabled. Consequently, if, in response to the aforesaid read-synchronizing pulse on conductor RS1, an "O" is read in track B(8) whereby output conductor PBO of the B pulse-stretcher PB(8) remains at a relatively high positive potential, a relatively high positive potential will be applied to the grid of the left-hand section of tube T4(8), causing a rise in the cathode potential of that tube, thereby partially enabling (so far as this control is concerned) both the Write X and the Write O gates. Conversely, if an "X" is read in track B(8) while there is an "X" carried, tube T4(8) will not have its conduction increased and both the Write X and the Write O gates will be disabled. This is as it should be in accordance with the foregoing theoretical discussion (see Table I) since a "change-what-is-read" order should be transmitted, assuming an "X" to be carried, when an "O" is read in track B(8) $(BO+CX)$ but not when an "X" is read in track B(8) $(BX+CX)$.

There remains to be considered the operation of the apparatus whereby the carry trigger CT(8) is set to its appropriate condition.

As has been described in detail hereinbefore, when a read-synchronizing pulse is received on conductor RS1, the contents of track A(8), track B(8) and carry trigger CT(8) are read to ascertain the then-obtaining combination of those elements for any particular digit place. The result of the addition of those three elements may or may not require a "carry" to the next digit place. Whether there should or should not be a "carry" to the next digit place, it was found in the previous consideration of the theory involved that the carry trigger CT(8) should be set to its "O" condition (i. e., to the right) whenever an "O" is read in both tracks A(8) and B(8) (i. e., $AO+BO$) and should be set to its "X" condition (i. e., to the left) whenever an "X" is read in both tracks A(8) and B(8) (i. e., $AX+BX$).

To provide this operation, conductor PAO of the A pulse-stretcher PA(8) is connected through the No. 5 contact of switch bank SW3(7) and via conductor 712 to varistor VA1(8); conductor PAX of the A pulse-stretcher PA(8) is connected through the No. 5 contact of switch bank SW4(8) and via conductor 711 to varistor VA2(8); conductor PBX of the B pulse-stretcher PB(8) is connected to varistor VBX1(8); and conductor PBO of the B pulse-stretcher PB(8) is connected to varistor VBO1(8). Thus, if an "O" is read in both track A(8) and track B(8) $(AO+BO)$, gate G3(8), comprising varistors VA1(8), VBO1(8) and VW1(8), will be partially enabled, and gate G4(8), comprising varistors VW2(8), VA2(8) and VBX1(8), will be disabled. If an "X" is read in both tracks A(8) and B(8) $(AX+BX)$, gate G4(8) will be partially enabled and gate G3(8) will be disabled. On any other combination, both gates G3(8) and G4(8) will be disabled.

If gate G3(8) or G4(8) is otherwise partially enabled, the next positive-going write-synchronizing pulse on conductor WS1, which is applied to varistors VW1(8) and VW2(8), will be applied to the grid of tube T1(8) or T2(8), respectively, whereby a negative-going pulse will be applied to input conductor TCO or TCX, respectively, of carry trigger CT(8). If the combination $AO+BO$ has been read, whereby a negative-going pulse is applied to input conductor TCO, carry trigger CT(8) will be triggered so as to be conducting on its right-hand section, and if the combination $AX+BX$ is read, a negative-going pulse will be applied to input conductor TCX whereby carry trigger CT(8) will be triggered so as to be conducting on its left-hand section. Obviously, if carry trigger CT(8) is already conducting on its right-hand or left-hand section, respectively, the pulse will have no effect; this corresponds with what is required.

In this fashion, carry trigger CT(8) is properly set for the reading of the next digit place, without, however, affecting the remembered value of its previous condition, now being held in pulse-stretcher PC(8).

The operation of the circuit continues through the several digit places of the initially recorded numbers, with the results of the progressive addition being recorded in track A(8) replacing, cell-by-cell, the information originally recorded there. At the digit place next succeeding the last digit place of the recorded numbers, an "O" will be read in both track A(8) and track B(8) because an "O" is always written in this position, whatever the value set up for A or B. The registration in track A(8) will therefore remain unchanged if there was no "carry" or will be changed to an "X" if there was a "carry." This represents a sum of one more digit place than the maximum number which could be set up for the augend, "A," in the equipment as assumed. In either event, the coincidence of "O's" in both tracks will cause the carry trigger CT(8) to become conductive on its right-hand section, i. e., to register an "O" to carry. Thereafter all three of the pertinent elements will read "O" and no further writing will occur. When the supervisory trigger SU(7) is restored to normal, in the manner above described, no further writing can occur and the apparatus will continue to read but not display the contents of tracks A(8) and B(8) and of the carry trigger CT(8) until it is directed to do otherwise by the actuation of the proper switches. As will be described in detail hereinafter, the results of the addition can be made available to the operator by setting switch SW(7) to position 3, "Read A," and momentarily operating the actuating key AK(7). The new, altered contents of track A(8) will then be displayed on the display lamps, D1(6) to DE(6), a lighted lamp corresponding to an "X" and an unlighted lamp corresponding to an "O" in the indicated digit place. The DE(6) lamp takes care of the possibility of the sum being greater than the maximum augend.

The apparatus disclosed as the preferred embodiment of the invention is also capable of subtracting a number recorded in track B(8) from the number recorded in track A(8) and recording the difference in, for example, track A(8).

In general, the operation of the appartus in performing subtraction is not greatly different from that of addition. Instead of a "carry" which may have originated in an earlier operation and which may or may not have to be transmitted for a future operation, the apparatus must be capable of properly treating a "borrow," which may have originated in an earlier operation and which may or may not have to be passed along for a future operation. The "borrow," like the "carry," can have only one of two values and can, in fact, be considered as a kind of inverse carry; it will be labeled C′ in the following discussion.

As before, for any digit position, only eight possible situations may exist, as follows:

TABLE II

*Subtraction*

| Possibility | 1 | 2 | 3 | 4 | 5 | 6 | 7 | 8 |
|---|---|---|---|---|---|---|---|---|
| I. Channel A | O | O | O | O | X | X | X | X |
| II. Channel B | O | O | X | X | O | O | X | X |
| III. C′ (borrow) | O | X | O | X | O | X | O | X |
| IV. Value required in A to represent difference | O | X | X | O | X | O | O | X |
| V. "Borrow" value to be passed on | O | X | X | X | O | O | O | X |
| VI. "Change-what-is-read" order to channel A? | No | Yes | Yes | No | No | Yes | Yes | No |
| VII. Order to borrow trigger CT | ------ | ------ | X | ------ | ------ | O | ------ | ------ |

A comparison of Table II with the table for Addition, Table I, shows that the "change-what-is-read" orders are exactly the same if the output indications "borrow" and "carry" are considered on the same footing. Orders to the borrow trigger, however, are different from those to the carry trigger. For the borrow trigger, $(AX+BO)$ must gate the "O" input of the trigger and $(AO+BX)$ must gate the "X" input. In these expressions, it will be noted, the values of "A" are complementary to those used for the case of addition.

There is, however, one possible complication in the subtraction process which does not appear in addition. If the larger of two numbers is subtracted from the smaller, the result is normally expressed as a negative number of the same magnitude as would be obtained by subtracting the smaller from the larger. The rules previously developed herein will not give this magnitude of result, nor any explicit indication of the negative quality. The rules do however, lead to a result, in terms of a digit pattern, and an indication of "borrow" beyond the last or most significant place. If this persisting borrow indication is regarded as evidence of an "improper" subtraction, that is one leading to a negative quantity as an outcome, then the correct magnitude of outcome can be obtained by taking the complement of the existing result and augmenting it by unity. A method of accomplishing this is disclosed hereinafter.

Therefore, the circuitry, connections and manner of operation of the system in the mathematical operation of subtraction are identical to those previously described with reference to the operation of addition except for the setting of the "carry" (here, "borrow") trigger CT(8), and only the latter operation will be described.

As has been described in detail hereinbefore, when a read-synchronizing pulse is applied to conductor RS1, the contents of track A(8), track B(8) and "borrow" trigger CT(8) are read to ascertain the then-obtaining combination of those elements for any particular digit place. The result of a subtraction of those elements may or may not require a borrow from the next digit place. Whether there should or should not be a "borrow" from the next digit place, it was found in the previous consideration of the theory involved, is uniquely determined by the value found in the A and B digit places. The "borrow" trigger CT(8) should be set to its "O" condition (i. e., to the right) whenever an "X" is read in track A(8) and an "O" in track B(8) $(AX+BO)$ and should be set to its "X" condition (i. e., to the left), whenever an "O" is read in track A(8) and an "X" in track B(8) $(AO+BX)$.

To provide this operation, with switch SW(7) set to its No. 6 "subtract" position, output conductor PAX from the A pulse-stretcher PA(8) is connected through the No. 6 contact of switch bank SW4(7) and via conductor 712 to varistor VA1(8) of gate G3(8), output conductor PAO from the A pulse-stretcher PA(8) is connected through the No. 6 contact of switch bank SW3(7) and via conductor 711 to varistor VA2(8) of gate G4(8), and output conductors PBX and PBO from the B pulse-stretcher PB(8) are connected as in the before-described operation of addition, i. e., to varistor VBX1(8) of gate G4(8) and varistor VBO1 (8) of gate G3(8), respectively. Thus, if an "X" is read in track A(8)and "O" in track B(8) $(AX+BO)$, gate G3(8), comprising varistors VA1(8), VBO1(8) and VW1(8), will be partially enabled and gate G4(8), comprising varistors VW2(8), VA2(8) and VBX1(8), will be disabled; if an "O" is read in track A(8) and if an "X" is read in track B(8) $(AO+BX)$, gate G4(8) will be partially enabled and gate G3(8) will be disabled. On any other combination, both gates G3(8) and G4(8) will be disabled. If gate G3(8) or G4(8) is otherwise partially enabled, the next positive-going write-synchronizing pulse on conductor WS1, which is applied to varistors VW1(8) and VW2(8), will be applied to the control grid of tube T1(8) or T2(8), respectively, whereby a negative-going pulse will be applied to input conductor TCO or TCX, respectively, of "borrow" trigger CT(8). If the combination $AX+BO$ is read, whereby a negative-going pulse is applied to input conductor TCO, "borrow" trigger CT(8) will be triggered so as to be conducting on its right-hand section, and if the combination $AO+BX$ is read, whereby a negative-going pulse is applied to conductor TCX, "borrow" trigger CT(8) will be triggered so as to be conducting on its left-hand section. Obviously, if "borrow" trigger CT(8) is already conducting on its right-hand or left-hand section, respectively, the pulse will have no effect. This is in accordance with what is required.

In this fashion the "borrow" trigger CT(8) is properly set for the reading of the next digit place.

If a persisting "borrow" indication occurs after the operation of subtraction is completed (as may be perceived by the "Read A" operating procedure which will result in a discharge or glow in indicator diode DE(6), in the manner hereinafter to be described), it is apparent that a larger number, recorded in channel B(8), has been subtracted from a smaller number, recorded in channel A(8). It was previously indicated that the correct result can be obtained by taking the complement of the existing result and adding "1" thereto.

This corrective operation may be performed by the disclosed apparatus. Means are provided in the form of a key COM(8), for applying a potential to varistors VXC(8) and VOC(8) of the proper amplitude partially to enable both the Write O and the Write X gates. If varistors VXC(8) and VOC(8) are biased to their high impedance conditions in this fashion, upon the concurrent application of the supervisory pulse to varistors VXS(8) and VOS(8) and of the write-synchronizing pulse to varistors VXW(8) and VOW(8), a "change-what-is-read" order will be transmitted over conductor WXO or WOO each cell, so long as switch SW(7) is set in either its No. 5 or No. 6 position. Therefore, the complement of the number recorded in channel A(8) may be obtained and written in channel A(8) by setting switch SW(7) in its No. 5 or 6 position, operating key COM(8), and depressing actuating key AK(7). The number "1" may then be set in channel B(8) by setting switch SW(7) to its No. 2 position, depressing key K1(6) and releasing all others of the keys K2(6) to K*n*(6), releasing key COM(8) and depressing actuating key AK(7). The proper ultimate result may then be obtained by adding the contents of channel B(8) to that of channel A(8) by setting switch SW(7) to its No. 5 position and operating key AK(7).

The contents of channels A(8) and B(8) may be read and displayed at any time, either before or after the mathematical operations have been performed. In order to read and correctly display the contents of channel A, for example, the "extinguish display" key ED(6) is momentarily operated to clear the display register of any previous registration by triggering the display triggers DT1(6) to DTE(6) so as they will be conducting on their left-hand sections, as shown, and so that, as a result, indicator diodes D1(6) to DE(6) will be extinguished. Switch SW(7) should then be set at its No. 3 "Read A" position and the actuating key AK(7) depressed.

As has been hereinbefore described, at any time at which drum DR(8) is revolving and at which the various supply potentials are provided for the system, the read-synchronizing monopulser RS(7), the write-synchronizing monopulser WS(7) and the step-synchronizing monopulser SS(7) are operating to apply the pulses shown on Figs. 15E to 15G, respectively, to conductors RS1, WS1 and SS1, respectively. Pulses appearing on conductor SS1 are applied to varistor V2(6) of the stepping gate SG(6).

At the first mark pulse on conductor MM1 (Fig. 15B) following the operation of actuating key AK(7) (Fig.

15A) and key trigger KT(7) (Fig. 15C), supervisory trigger SU(7) is triggered so that a relatively high positive potential applied to conductor SU1 (Fig. 15D). This relatively high positive potential on conductor SU1 is applied to varistor V1(6) of stepping gate SG(6). At the concurrent application of these relatively high positive potentials to varistors V1(6) and V2(6) of stepping gate SG(6), a pulse is applied via conductor SG1 to the stepping chain of Fig. 6. The first such pulse triggers start tube ST(6) to the left (Fig. 15H), and tube S1(6) to the right, producing at the anode of the left-hand section of tube S1(6) a positive-going pulse (Fig. 15I) which is applied to varistor V1A(6), thereby partially enabling the display gate comprising varistors V1A(6) and V1B(6), whereas all of the remaining display gates remain disabled. The next read-synchronizing pulse on conductor RS1 (Fig. 15E) precipitates the reading of the contents of the first cell of track A(8) (as identified by the mark pulse), that cell containing the least significant digit of the number recorded in track A(8). As a result of this reading, output conductor PAX of the A pulse-stretcher PA(8) remains at a relatively low positive potential if an "O" is read in track A(8) and attains a relatively high positive potential if an "X" is read in track A(8). The potential on conductor PAX is applied through the No. 3 contact of switch bank SW7(7) and via conductor 702 to varistors V1B(6), V2B(6) . . . V*n*B(6) and VEB(6). The gate comprising varistors V1A(6) and V1B(6), and only that gate, has already been partially enabled, and consequently if an "X" was read in track A(8) a positive-going pulse will be applied to display trigger DT1(6) only, causing trigger DT1(6) to become conducting on its right-hand section, raising the potential applied to its output conductor and discharging the gaseous discharge device D1(6) to display the fact that an "X" was registered in track A(8). If, on the other hand, output conductor PAX from the A pulse-stretcher PA(8) had remained at a low value of positive potential due to the reading of an "O" in the subject cell of track A(8), no pulse would have been applied to trigger DT1(6) and diode D1(6) would have remained extinguished, thereby indicating that an "O" was read.

Similarly, at the next pulse on conductor SG1, tube S1(6) is triggered back to its initial condition, thereby disabling the gate comprising varistors V1A(6) and V1B(6), and tube S2(6) is triggered so as to be conducting on its right-hand section, thereby partially enabling the display gate comprising varistors V2A(6) and V2B(6). At the next read-synchronizing pulse on conductor RS1, a relatively high positive potential will be applied via conductor 702 to varistor V2B(6) if an "X" is read in the second digit plate of track A(8), and a relatively low positive potential will be applied via conductor 702 to varistor V2B(6) if an "O" was read in the second digit place of track A(8). In the former case, display trigger DT2(6) will be triggered to discharge indicator diode D2(6); in the latter case display trigger DT2(6) will not be triggered and indicator diode D2(6) will remain extinguished.

In a similar fashion the contents of the succeeding cells of track A(8), and thus the succeeding digit places of the number recorded in track A(8), are displayed on the succeeding diode indicators. The last digit place of the recorded number should be recorded in diode D*n*(6). However, in the before-mentioned contingency wherein the number recorded in track B(8) is larger than the number recorded in track A(8) and the operation of subtraction is performed, an "X" will be found in the $n+1$th digit place of track A(8), indicating that there was a "borrow" from the next succeeding, but non-existent, digit place. This fact will be indicated by a discharge in diode DE(6) and the previously described corrective action should be taken. In the case of addition, as previously noted, an indication in the DE(6) diode indicates a sum having one higher significant place than the maximum provided on the key-set for writing A or B numbers.

The display of the contents of track B(8) of drum DR(8) proceeds in exactly the same manner as the display of the contents of track A(8) except that switch SW(7) is set to its No. 4 "Read B" position so that output conductor PBX from the B pulse-stretcher PB(8) will be connected to conductor 702 rather than output conductor PAX from the A pulse-stretcher PA(8).

While the preferred embodiments of the invention have been described, for convenience and clarity, on the basis of an assumption that a complete revolution of the drum is required for the completion of one operation, it is apparent that normally the complete information pertaining to any given set of values may be recorded on but a portion of the full circumference of the drum and that, therefore, a plurality of complete operations may be completed in one revolution of the drum. It is also apparent that as long as the proper time relationships are maintained, the physical locations of the several heads on any one drum, relative one to the other, are not critical so that the heads may be aligned, as shown, or may be staggered about the circumference of the drum.

It is to be understood that the above-described arrangements are but illustrative of the application of the principles of the invention. Numerous other arrangements may be devised by those skilled in the art without departing from the spirit and scope of the invention.

What is claimed is:

1. A computer comprising a magnetic head, sensing means including said magnetic head, recording means including said magnetic head, a magnetizable medium, a plurality of areas on said medium common to said magnetic head and selectively magnetized in combinations to represent a first number, and means comprising said recording means and controlled by said sensing means for selectively changing the magnetization of said areas so as to represent a number differing from said first number by a predetermined amount.

2. A computer comprising a magnetic head, sensing means, including said magnetic head, recording means including said magnetic head, a magnetizable medium, a plurality of areas on said medium common to said magnetic head, means including said recording means for selectively magnetizing said areas in combinations so as to represent a first number, and means comprising said recording means and controlled by said sensing means for selectively changing the magnetization of said areas so as to represent a number differing from said first number by a predetermined amount.

3. A computer comprising a magnetic head, sensing means including said magnetic head, recording means including said magnetic head, a magnetizable medium, a plurality of areas on said medium common to said magnetic head and selectively magnetized in combinations to represent a first number, means comprising said sensing means for sensing the magnetization of each of the successive ones of said areas as they pass said magnetic head, and means comprising said recording means and controlled by said sensing means for selectively changing on the same pass of said areas past said magnetic head the magnetization of each of the successive ones of said areas so as to represent a number differing from said first number by a predetermined amount.

4. A computer comprising a magnetic head, sensing means including said magnetic head, recording means including said magnetic head, a magnetizable medium, means for moving said medium relative to said magnetic head, a plurality of areas on said medium common to said magnetic head, means including said recording means for selectively magnetizing said areas in combinations so as to represent a first number, control means comprising said sensing means and each of said areas, and means controlled by said control means for selectively changing the magnetization of said areas so as to represent a number differing from said first number by a predetermined amount.

5. A computer comprising a magnetic head, sensing means including said magnetic head, recording means including said magnetic head, a magnetizable medium, means for moving said medium relative to said magnetic head, a plurality of areas on said medium common to said magnetic head, means including said recording means for selectively magnetizing said areas in combinations so as to represent a first number, control means comprising said sensing means for sensing the magnetization of each of the successive ones of said areas as they pass said magnetic head, and means comprising said recording means and controlled by said control means for selectively changing on the same pass of said areas past said magnetic head the magnetization of said areas so as to represent a number differing from said first number by a predetermined amount.

6. A computer comprising a magnetic head, sensing means including said magnetic head, recording means including said magnetic head, a magnetizable medium, means for moving said medium relative to said magnetic head, a plurality of areas on said medium common to said magnetic head and selectively magnetized to represent a first number, control means, and means comprising said recording means and controlled by said control means for selectively changing the magnetization of said areas so as to represent a number differing from said first number by a predetermined amount, said control means comprising said sensing means, each of said plurality of areas, and means for defining the location of a preselected one of said areas.

7. A computer comprising a magnetic head, sensing means including said magnetic head, recording means including said magnetic head, a magnetizable medium, means for moving said medium relative to including said magnetic head, a plurality of areas on said medium common to said magnetic head, means including said recording means for selectively magnetizing said areas so as to represent a first number, control means effective as each one of said areas passes said magnetic head, and means comprising said recording means and controlled by said control means for selectively changing on the same pass of said areas past said magnetic head the magnetization of said areas so as to represent a number differing from said first number by a predetermined amount, said control means comprising said sensing means, each of said plurality of areas, and means for defining the location of a preselected one of said areas.

8. A computer comprising a magnetic head, sensing means including said magnetic head, recording means including said magnetic head, a magnetizable medium, means for moving said medium relative to said magnetic head, a plurality of areas on said medium common to said magnetic head and selectively magnetized to represent a first number, control means, and means comprising said recording means and controlled by said control means for selectively changing the magnetization of said areas so as to represent a number differing from said first number by a predetermined amount, said control means comprising said sensing means, each of said plurality of areas, an additional magnetized area, an additional sensing means individual to said additional magnetized area, an additional plurality of magnetized areas, and a further sensing means common to said additional plurality of magnetized areas.

9. A computer comprising a magnetic head, sensing means including said magnetic head, recording means including said magnetic head, a magnetizable medium, means for moving said medium relative to said magnetic head, a plurality of areas on said medium common to said magnetic head, means including said recording means for selectively magnetizing said areas so as to represent a first number, control means effective as each one of said areas passes said magnetic head, and means comprising said recording means and controlled by said control means for selectively changing on the same pass of said areas past said magnetic head the magnetization of said areas so as to represent a number differing from said first number by a predetermined amount, said control means comprising said sensing means, each of said plurality of areas, an additional magnetized area, an additional sensing means individual to said additional magnetized area, an additional plurality of magnetized areas, and a further sensing means common to said additional plurality of magnetized areas.

10. A computer comprising a magnetic head, sensing means including said magnetic head, recording means including said magnetic head, a magnetizable medium, means for moving said medium relative to said magnetic head, a plurality of areas on said medium common to said magnetic head, means including said recording means for selectively magnetizing said area so as to represent a first number, control means effective as each one of said areas passes said magnetic head, and means comprising said recording means and controlled by said control means for selectively changing on the same pass of said areas past said magnetic head the magnetization of said areas so as to represent a number differing from said first number by a predetermined amount, said control means comprising said sensing means, each of said plurality of areas and the one of said areas immediately preceding said each of said areas.

11. A computer comprising a magnetic head, sensing means including said magnetic head, recording means including said magnetic head, a magnetizable medium, means for moving said medium relative to said magnetic head, a plurality of areas on said medium common to said magnetic head and selectively magnetized to represent a first number, means comprising said sensing means for sensing the magnetization of each of the successive ones of said areas as they pass said magnetic head, and apparatus comprising said recording means for selectively changing on the same pass of said areas past said magnetic head the magnetization of each of the successive ones of said areas so as to represent a number differing from said first number by a predetermined amount, said apparatus being controlled by said sensing means and by the selective magnetization of the one of said areas which passed said sensing device immediately before the one of said areas which is passing said sensing device at any intant.

12. A computer comprising a magnetic head, sensing means including said magnetic head, recording means including said magnetic head, a magnetizable medium, means for moving said medium relative to said magnetic head, a plurality of areas on said medium common to said magnetic head, means including said recording means for selectively magnetizing said areas so as to represent a first number, control means effective as each one of said areas passes said magnetic head, and means comprising said recording means and controlled by said control means for selectively changing on the same pass of said areas past said magnetic head the magnetization of said areas so as to represent a number differing from said first number by a predetermined amount, said control means comprising said sensing means, and each of said plurality of areas.

13. A computer comprising a magnetic head, sensing means including said magnetic head, recording means including said magnetic head, a magnetizable medium, means for moving said medium relative to said magnetic head, a plurality of areas on said medium common to said magnetic head, means including said recording means for selectively magnetizing said areas so as to represent a first number, control means effective as each one of said areas passes said magnetic head, and means comprising said recording means and controlled by said control means for selectively changing on the same pass of said areas past said magnetic head the magnetization of said areas so as to represent a number differing from said first number by a predetermined amount, said control means comprising said sensing means, each of said plurality of areas, an additional magnetized area on said medium, an additional sensing means individual to said additional magnetized areas, and appratus conjointly controlled by both said sensing means for controlling said recording means.

14. A computer comprising a magnetic head, sensing means including said magnetic head, recording means including said magnetic head, a magnetizable medium, means for moving said medium relative to said magnetic head, a plurality of areas on said medium common to said magnetic head, means including said recording means for selectively magnetizing said areas so as to represent a first number, control means effective as each one of said areas passes said magnetic head, and means comprising said recording means and controlled by said control means for selectively changing on the same pass of said areas past said magnetic head the magnetization of said areas so as to represent a number differing from said first number by a predetermined amount, said control means comprising said sensing means, each of said plurality of areas, an additional plurality of magnetized areas, an additional sensing means common to said additional plurality of magnetized areas, and apparatus conjointly controlled by both of said sensing means for controlling said recording means.

15. A computer comprising a magnetic head, first sensing means including said magnetic head, recording means including said magnetic head, a magnetizable medium, means for moving said medium relative to said magnetic head, a first plurality of areas on said medium common to said magnetic head, said areas being selectively magnetized to represent a first number, control means, a second sensing means controlling said first sensing means, a second plurality of magnetized areas movable relative to said second sensing means, and means comprising said recording means and controlled by said control means for selectively changing the magnetization of said areas so as to represent a number differing from said first number by a predetermined amount, said control means comprising said first and said second sensing means, said first and said second pluralities of areas, and apparatus conjointly controlled by both of said sensing means for controlling said recording means.

16. A computer comprising a magnetic head, first sensing means including said magnetic head, recording means including said magnetic head, a magnetizable medium, means for moving said medium relative to said magnetic head, a first plurality of areas on said medium common to said magnetic head, said areas being selectively magnetized to represent a first number, control means, a second plurality of movable magnetized areas, second sensing means common to said second plurality of areas, an additional movable magnetized area, a third sensing means individual to said additional magnetized area, and means comprising said recording means and controlled by said control means for selectively changing the magnetization of said first plurality of areas so as to represent a number differing from said first number by a predetermined amount, said control means comprising all of said sensing means, apparatus conjointly controlled by both said first and said second sensing means, and means conjointly controlled by said third sensing means and by said apparatus for controlling said recording means.

17. A computer comprising a magnetic head, first sensing means including said magnetic head, recording means including said magnetic head, a magnetizable medium, means for moving said medium relative to said magnetic head, a first plurality of areas on said medium common to said magnetic head, said areas being selectively magnetized to represent a first number, control means, a second plurality of movable magnetized areas, second sensing means common to said second plurality of areas and controlling said first sensing means, an additional movable magnetized area, third sensing means individual to said additional magnetized area, and means comprising said recording means and controlled by said control means for selectively changing on the same pass of each of said first plurality of areas past said magnetic head the magnetization of said first plurality of areas so as to represent a number differing from said first number by a predetermined amount, said control means comprising all of said sensing means, said first and said second pluralities of areas, apparatus conjointly controlled by both said first and said second sensing means, said additional magnetized area, and means conjointly controlled by said third sensing means and by said apparatus for controlling said recording means.

18. In combination, a movable magnetizable medium, a plurality of areas on said medium, and means for selectively magnetizing said areas comprising pulse-operated writing means, a writing-pulse source, and control means for selectively connecting said pulse source to said writing means, said control means comprising a gate connected to said source and said writing means, stepping means controlled by said pulse source, a plurality of outputs for said stepping means, and means for selectively connecting the outputs of said stepping means to said gate.

19. In combination, a movable magnetizable medium, a first plurality of areas on said medium, and means for selectively magnetizing said areas comprising pulse-operated writing means common to said plurality of magnetizable areas, a second plurality of magnetized areas, sensing means common to said second plurality of magnetized areas, a pulse generator controlled by said sensing means, a gate connected to said generator and to said writing means, stepping means controlled by said pulse generator, a plurality of outputs for said stepping means, and means for selectively connecting the outputs of said stepping means to said gate.

20. In combination, a movable magnetizable medium, a first plurality of areas on said medium, and means for selectively magnetizing said areas comprising pulse-operated writing means common to said first plurality of magnetizable areas, a second plurality of movable magnetized areas, first sensing means common to said second plurality of magnetized areas, an additional movable magnetized area, second sensing means individual to said additional movable area, a pulse generator controlled by said first sensing means, a gate connected to said generator and to said writing means, stepping means controlled conjointly by said generator and by said second sensing means, a plurality of outputs for said stepping means, and means for selectively connecting the outputs of said stepping means to said gate.

21. A computer comprising a magnetic head, a first sensing device including said magnetic head, a recording device including said magnetic head, a magnetizable medium movable relative to said magnetic head, a first plurality of areas on said medium common to said magnetic head, said areas being selectively magnetized to represent a first number, a second sensing device, a second plurality of areas selectively magnetized to represent a second number and movable relative to said second sensing device, and means comprising said recording means and controlled by both said first and said second sensing means for selectively changing the magnetization of said first plurality of areas so as to represent a number differing from said first number by an amount equal to said second number.

22. A computer comprising a magnetic head, first sensing means including said magnetic head, recording means including said magnetic head, a magnetizable medium movable relative to said magnetic head, a first plurality of areas on said medium common to said magnetic head, said areas being selectively magnetized to represent a first number, means comprising said first sensing means for sensing the magnetization of each of the successive ones of said areas as they pass said magnetic head, second sensing means, a second plurality of magnetizable areas movable relative to said second sensing means, said second plurality of areas being selectively magnetized to represent a second number, control means comprising said second sensing means for sensing the magnetization of each of the successive ones of said second plurality of magnetizable areas as they pass said second sensing means, and means controlled by said control means and comprising said recording means for selectively changing on the same pass of said areas past said magnetic head the magnetization of each of the successive ones of said first plurality of areas so as to represent a number differing from said first number by an amount equal to said second number.

23. A computer comprising a first and a second magnetizable area, each of said areas being in a first or a second magnetic condition, first sensing means for sensing said first magnetizable area, second sensing means for sensing said second magnetizable area, a register having a first and a second electrical condition, means conjointly controlled by said first and said second sensing means for setting said register in its first electrical condition only if said areas are both in their first magnetic conditions, and means conjointly controlled by said first and said second sensing means for setting said register in its second electrical condition only if said areas are both in their second magnetic conditions.

24. A computer comprising a first and a second magnetizable area, each of said areas being in a first or a second magnetic condition, first sensing means for sensing said first magnetizible area, second sensing means for sensing said second magnetizable area, a register having a first and a second electrical condition, means conjointly controlled by said first and said second sensing means for setting said register in its first electrical condition only if said first area is in its first magnetic condition and said second area is in its second magnetic condition, and means conjointly controlled by said first and said second sensing means for setting said register in its second electrical condition only if said first area is in its second magnetic condition and said second area is in its first magnetic condition.

25. A computer comprising a first and a second magnetizable area, each of said areas being in a first or a second magnetic condition, first sensing means for sensing said first magnetizable area, second sensing means for sensing said second magnetizable area, a register having a first and a second electrical condition, means conjointly controlled by said first and said second sensing means for setting said register in its first electrical condition only if said areas are both in their first magnetic conditions, means conjointly controlled by said first and said second sensing means for setting said register in its second electrical condition only if said areas are both in their second magnetic conditions, control means, and apparatus for actuating said control means only if said register is in its first electrical condition.

26. A computer comprising a first and a second magnetizable area, each of said areas being in a first or a second magnetic condition, first sensing means for sensing said first magnetizable area, second sensing means for sensing said second magnetizable area, a register having a first and a second electrical condition, means conjointly controlled by said first and said second sensing means for setting said register in its first electrical condition only if said first area is in its first magnetic condition and said second area is in its second magnetic condition, means conjointly controlled by said first and said second sensing means for setting said register in its second electrical condition only if said first area is in its second magnetic condition and said second area is in its first magnetic condition, control means, and apparatus for actuating said control means only if said register is in its first condition.

27. A computer comprising a first and a second magnetizable area, each of said areas being in a first or a second magnetic condition, first sensing means for sensing said first magnetizable area, second sensing means for sensing said second magnetizable area, a register having a first and a second electrical condition, means controlled by said first and said second sensing means for setting said register in its first electrical condition only if said areas are both in their first magnetic condition, control means, and apparatus for actuating said control means only if said register is in its first electrical condition, said apparatus comprising a source of synchronizing pulses and a gate controlled conjointly by said register and by said source.

28. A computer comprising a first and a second magnetizable area, each of said areas being in a first or a second magnetic condition, first sensing means for sensing said first magnetizable area, second sensing means for sensing said second magnetizable area, a register having a first and a second electrical condition, means controlled by said first and said second sensing means for setting said register in its first electrical condition only if said first area is in its first magnetic condition and said second area is in its second magnetic condition, control means, and apparatus for actuating said control means only if said register is in its first electrical condition, said apparatus comprising a source of synchronizing pulses and a gate controlled conjointly by said register and by said source.

29. A computer comprising a magnetizable area, said area being in a first or a second magnetic condition, means for sensing the magnetic condition of said area, a register having only a first and a second electrical condition, writing means for changing the magnetic condition of said area, and apparatus controlled by said sensing means and said register for controlling said writing means, said apparatus being effective only if said area and said register are in opposite conditions.

30. A computer comprising a magnetizable area, said area being in a first or a second magnetic condition, means for sensing the magnetic condition of said area, a register controlled by said sensing means, writing means for changing the magnetic condition of said area, and apparatus controlled by said sensing means for controlling said writing means, said apparatus comprising a source of synchronizing pulses, and means for gating electrical pulses conjointly controlled by said register and said source.

31. A computer comprising a magnetizable area, said area being in a first or a second magnetic condition, means for sensing the magnetic condition of said area, a register controlled by said snesing means, writing means for changing the magnetic condition of said area, and apparatus for controlling said writing means, said apparatus comprising a source of synchronizing pulses, first means for gating electrical pulses conjointly controlled by said register and said source, and second means for gating electrical pulses conjointly controlled by said first gating means and said sensing means.

32. A computer comprising a magnetizable area, said area being in a first or a second magnetic condition, means for sensing the magnetic condition of said area, a register controlled by said sensing means, control means, a second magnetic area, writing means controlled by said control means for selectively magnetizing said second area, and apparatus for controlling said control means, said apparatus comprising a source of synchronizing pulses, first means for gating electrical pulses conjointly controlled by said register and said source, and second means for gating electrical pulses conjointly controlled by said first gating means and said sensing means.

References Cited in the file of this patent

UNITED STATES PATENTS

| | | |
|---|---|---|
| 2,540,654 | Cohen | Feb. 6, 1951 |
| 2,549,071 | Dusek | Apr. 17, 1951 |
| 2,564,403 | May | Aug. 14, 1951 |
| 2,609,143 | Stibitz | Sept. 2, 1952 |
| 2,609,439 | Marshall | Sept. 2, 1952 |
| 2,614,169 | Cohen | Oct. 14, 1952 |
| 2,700,148 | McGuigan et al. | Jan. 18, 1955 |

OTHER REFERENCES

Progress Report 2, distributed Nov. 10, 1948, The Computation Laboratory, Harvard University, Cambridge, Massachusetts. Pages II–5 to II–21, 17 pages.

Electronic Engineers. "A Magnetic Digital Storage System" by Booth. July, 1949, pages 234–238.

Proceedings of the Inst. of Electrical Engineers, "Universal High Speed Digital Computers: A Magnetic Store" by Williams et al., pages 94–106, April, 1952.